US012204742B1

(12) United States Patent
Edwards et al.

(10) Patent No.: US 12,204,742 B1
(45) Date of Patent: Jan. 21, 2025

(54) BEAMFORMING SYSTEMS FOR PERSONALIZED IN-VEHICLE AUDIO DELIVERY TO MULTIPLE PASSENGERS SIMULTANEOUSLY

(71) Applicant: Adeia Guides Inc., San Jose, CA (US)

(72) Inventors: Warren Keith Edwards, Atlanta, GA (US); Serhad Doken, Bryn Mawr, PA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/223,442

(22) Filed: Jul. 18, 2023

(51) Int. Cl.
*G06F 3/04842* (2022.01)

(52) U.S. Cl.
CPC .................. *G06F 3/04842* (2013.01)

(58) Field of Classification Search
CPC .................................................. G06F 3/048–05
See application file for complete search history.

(56) References Cited

U.S. PATENT DOCUMENTS

| | | | |
|---|---|---|---|
| 9,529,431 B2 | 12/2016 | Bleacher et al. | |
| 9,859,998 B2 | 1/2018 | Li et al. | |
| 10,248,376 B2 * | 4/2019 | Keyser-Allen | G06F 3/165 |
| 11,804,207 B1 * | 10/2023 | Salter | G10L 25/51 |
| 11,930,082 B1 * | 3/2024 | Singh | H04R 3/12 |
| 2009/0199120 A1 * | 8/2009 | Baxter | G06F 3/0482 |
| | | | 715/764 |
| 2013/0080955 A1 * | 3/2013 | Reimann | G06F 3/0482 |
| | | | 715/769 |
| 2013/0170668 A1 * | 7/2013 | Hess | H03G 3/20 |
| | | | 381/107 |
| 2014/0348354 A1 * | 11/2014 | Christoph | H04R 29/001 |
| | | | 381/303 |
| 2015/0242073 A1 * | 8/2015 | Munoz | G06F 3/165 |
| | | | 715/777 |
| 2016/0004417 A1 * | 1/2016 | Bates | G06F 3/04817 |
| | | | 715/716 |
| 2016/0299736 A1 * | 10/2016 | Bates | G06F 3/04847 |
| 2016/0372134 A1 * | 12/2016 | Nakadai | G10L 15/20 |
| 2017/0213541 A1 * | 7/2017 | MacNeille | G10K 11/17881 |
| 2017/0323639 A1 * | 11/2017 | Tzirkel-Hancock | |
| | | | B60H 1/00757 |

(Continued)

OTHER PUBLICATIONS

"CES 2016: TV plays different audio to two viewers," BBC News, https://www.bbc.com/news/av/technology-35259687 (Jan. 2016).

(Continued)

*Primary Examiner* — Daniel Rodriguez
(74) *Attorney, Agent, or Firm* — Haley Guiliano LLP

(57) ABSTRACT

Systems and methods are provided herein for providing personalized audio for different users in a vehicle. This may be accomplished by a vehicle entertainment system determining the positions of one or more users within the vehicle. The vehicle entertainment system may then select a zone configuration based on the determined positions and output audio according to the selected zone configuration. For example, a first user sitting in the back of the vehicle may be located in a first zone of the selected zone configuration and a second user sitting in the back of the vehicle may be located in a second zone of the selected zone configuration. The vehicle entertainment system may output a first piece of audio to the first zone and a second piece of audio to the second zone using one or more techniques (e.g., beamforming).

20 Claims, 13 Drawing Sheets

(56) References Cited

U.S. PATENT DOCUMENTS

| | | | | |
|---|---|---|---|---|
| 2018/0181359 | A1* | 6/2018 | Monroe | G06F 3/0488 |
| 2018/0246641 | A1* | 8/2018 | Glaser | B60K 35/10 |
| 2018/0302734 | A1* | 10/2018 | Choi | H04S 7/30 |
| 2019/0306607 | A1* | 10/2019 | Clayton | H04R 27/00 |
| 2020/0053464 | A1* | 2/2020 | Peters | H04S 7/304 |
| 2020/0174738 | A1* | 6/2020 | Pratt | G06F 3/165 |
| 2020/0183640 | A1* | 6/2020 | Kitson | H04R 27/00 |
| 2020/0202857 | A1* | 6/2020 | Peng | G10L 25/51 |
| 2020/0324785 | A1* | 10/2020 | Sedaghat | G06V 20/59 |
| 2020/0329307 | A1* | 10/2020 | Groene | G10K 11/17885 |
| 2021/0316745 | A1* | 10/2021 | Zuo | B60R 16/0373 |
| 2022/0236840 | A1* | 7/2022 | Kim | B60K 35/60 |
| 2022/0329963 | A1 | 10/2022 | Winton et al. | |
| 2023/0004342 | A1* | 1/2023 | Trestain | H04S 7/30 |
| 2023/0074058 | A1 | 3/2023 | Gean et al. | |
| 2023/0150441 | A1* | 5/2023 | Kim | B60R 16/03 307/10.1 |
| 2023/0217200 | A1* | 7/2023 | Sun | H04R 1/025 381/103 |
| 2023/0217202 | A1 | 7/2023 | Boothe et al. | |
| 2023/0325146 | A1* | 10/2023 | Mistry | G10L 17/22 715/706 |

OTHER PUBLICATIONS

"HOLOPLOT Technology: A revolution in sound control," HOLOPLOT, https://holoplot.com/technology/.

"Introducing XSeries," Audio Spotlight by holosonics, https://www.holosonics.com/.

D. Barnwell, "What's the deal with ultra wideband, bmw key plus," 2021, https://www.bmw.com/en/innovation/bmw-digital-key-plus-ultra-wideband.html.

Coppens, Dieter et al., "An Overview of UWB Standards and Organizations (IEEE 802.15.4, FiRa Apple): Interoperability Aspects and Future Research Directions," IEEE Access, vol. 10 (2022).

Dormehl, Luke, "Who needs headphones? Holoplot can beam audio directly to your ears from afar," DigitalTrends, https://www.digitaltrends.com/cool-tech/holoplot-beamforming-audio/.

* cited by examiner

100

BEAMFORMING SYSTEMS FOR PERSONALIZED IN-VEHICLE AUDIO DELIVERY TO MULTIPLE PASSENGERS SIMULTANEOUSLY

BACKGROUND

The present disclosure relates to the delivery of content, and in particular to techniques for delivering personalized audio content to multiple users.

SUMMARY

Many modern vehicles have a variety of personalization mechanisms. For example, some vehicles provide users the ability to customize climate preferences for individual seats so a first user may use the air conditioning while a second user uses the heater. In another example, some vehicles provide personalized seat configurations so that a vehicle may automatically adjust how much a seat is reclined based on the user that started the vehicle. However, many vehicles fail to provide options for personalized in-vehicle entertainment. For example, most vehicle entertainment systems output one piece of media content (e.g., usually selected by a single user) to all the passengers in the vehicle. Accordingly, all the passengers are forced to listen to the same piece of media content. This situation can be made worse if a first user prefers a louder volume and a second user prefers a softer volume. If the vehicle outputs the media content according to the preferences of the first user, then the media content may be unpleasantly loud for the second user. If the vehicle outputs the media content according to the preferences of the second user, then the first user may be unable to hear the media content. Headphones may allow each passenger to listen to personalized audio content according to their own preferences, but there are safety implications with wearing headphones while driving. Additionally, using headphones makes conversation among passengers difficult. In view of these deficiencies, there exists a need for improved systems and methods for generating personalized audio for different users in a vehicle.

Accordingly, techniques are disclosed herein for providing personalized audio for different users in a vehicle. For example, a vehicle may comprise a vehicle entertainment system. The vehicle entertainment system may use one or more techniques to determine where one or more users are located within the vehicle. For example, the vehicle entertainment system may be equipped with one or more transceivers (e.g., ultra-wideband (UWB) transceiver) and/or similar such radios (e.g., Bluetooth transmitter, WiFi transceiver, etc.). The vehicle entertainment system may use the one or more transceivers to connect with user devices (e.g., smartphone, tablet, laptop, etc.) and determine the locations of the user devices. The vehicle entertainment system may use the determined location of the user devices to estimate the locations of the users associated with the user devices. In another example, the vehicle entertainment system may use one or more sensors (e.g., image sensors, weight/seat sensors, proximity sensors, infrared sensors, pressure sensors, sound sensors etc.) to determine the locations of the users within the vehicle.

The vehicle entertainment system may then compare the positions of the users with one or more zone configurations. In some embodiments, zone configurations correspond to pre-defined zones that represent the interior of the vehicle. For example, a first zone configuration may comprise a first zone corresponding to the front of the car and a second zone corresponding to the back of the car. In another example, a vehicle may comprise five seats and a second zone configuration may comprise five zones, wherein each zone corresponds to a seat of the car. The zone configurations may correspond to any number of zones and the zones may be of any shape or size. In some embodiments, the zones are uniform in size and shape, while in other embodiments, one or more zones are different in size and/or shape compared to one or more other zones. The zone configurations may be generated at the time of manufacture of the vehicle, at the time of the installation of the vehicle entertainment system, at a calibration time, in response to a user input (e.g., during a travel session) and/or at a similar such time. In some embodiments, the zone configurations are received from a device (e.g., user device, server, etc.).

In some embodiments, the vehicle entertainment system selects a zone configuration of a plurality of zone configuration based on the locations of users. The vehicle entertainment system may select the zone configuration with the fewest number of zones where at least one user is in each zone. For example, a first user may be located in a first seat and a second user may be located in a second seat. The vehicle entertainment system may select a first zone configuration comprising a first zone and a second zone, wherein the first zone corresponds to the first seat and the second zone corresponds to the second seat. The vehicle entertainment system may not select a second zone configuration comprising the first zone, the second zone, and a third zone because there are no users in the third zone.

The vehicle entertainment system may then output audio based on the selected zone configuration. For example, if the vehicle entertainment system selects the first zone configuration, the vehicle entertainment system may output a first piece of audio content to the first zone and a second piece of audio content to the second zone. The vehicle entertainment system may use one or more techniques to provide different audio content to the different zones. For example, the vehicle entertainment system may use a speaker array and beamforming techniques to focus the audio content so that the first piece of audio content is only discernable in the first zone. The vehicle entertainment system may output the first piece of audio content to the first zone and the second piece of audio content to the second zone based on one or more inputs. For example, the vehicle entertainment system may receive a first input (e.g., via a first device associated with a first user) from the first user sitting in the first zone. The first input may identify the first piece of audio content. The vehicle entertainment system may also receive a second input (e.g., via a second device associated with a second user) from the second user sitting in the second zone. The second input may identify the second piece of audio content. In response to receiving the first input and the second input, the vehicle entertainment system may output the first piece of audio content to the first zone using beamforming and may output the second piece of audio content to the second zone using beamforming.

The vehicle entertainment system may also receive one or more inputs from other devices. For example, the vehicle entertainment system may comprise one or more displays. The vehicle entertainment system may receive a first input when a first user interacts with the one or more displays. The first input may identify a first piece of audio content and a zone (e.g., first zone) corresponding to the first user. The vehicle entertainment system may receive a second input when a second user interacts with the one or more displays. The second input may identify a second piece of audio content and a zone (e.g., second zone) corresponding to the second user. In response to receiving the first input and the second input, the vehicle entertainment system may output the first piece of audio content to the first zone using beamforming and may output the second piece of audio content to the second zone using beamforming. In another example, the vehicle entertainment system may comprise one or more microphones. In some embodiments, the one or more microphones make up a beamforming microphone array. The vehicle entertainment system may receive a first input when the beamforming microphone array detects the first user uttering a first command (e.g., "Play Eye of the Tiger"). The vehicle entertainment system may determine the first piece of audio content (e.g., "Eye of the Tiger") and the location (e.g., first zone) of the first user based on the first input. The vehicle entertainment system may receive a second input when the beamforming microphone array detects the second user uttering a second command (e.g., "Play Dream On"). The vehicle entertainment system may determine the second piece of audio content (e.g., "Dream On") and the location (e.g., second zone) of the second user based on the second input. In response to receiving the first input and the second input, the vehicle entertainment system may output the first piece of audio content to the first zone using beamforming and may output the second piece of audio content to the second zone using beamforming.

In some embodiments, the vehicle entertainment system dynamically updates the zone configuration. For example, the vehicle entertainment system may select a zone configuration comprising a first zone, a second zone, and a third zone. The vehicle entertainment system may select the zone configuration because a first user is sitting in the first zone, a second user is sitting in the second zone, and a third user is sitting in the third zone. The vehicle entertainment system may detect that the third user exited the vehicle and then select an updated zone configuration. The updated zone configuration may only comprise a first zone and a second zone because a third zone is no longer necessary. The vehicle entertainment system may then output audio content to the first user and the second user based on the updated zone configuration. In another example, the vehicle entertainment system may receive a zone configuration request. For example, the first user may input a request using one or more devices, wherein the request indicates an updated zone configuration. In response to the zone configuration request, the vehicle entertainment system may change from outputting audio content according to the original zone configuration and output audio content according to the updated zone configuration.

One or more users may interact with the vehicle entertainment system via a user interface (UI). The UI may be displayed by one or more displays of the vehicle entertainment systems and/or by one or more user devices. The UI may comprise a plurality of UI elements. For example, a first UI element may be an audio content identifier (e.g., thumbnail image, title, etc.) corresponding to a piece of media content being outputted by the vehicle entertainment system. The first UI element may also comprise a progress bar corresponding to the piece of media content. One or more users may use the first UI element to issue one or more commands. For example, the one or more users may pause, rewind, replay, fast forward, and/or skip the piece of media by interacting with the UI element. The UI may also comprise a second UI element corresponding to one or more zone configurations. For example, the second UI element may comprise a first zone configuration overlayed over a depiction of the inside of the vehicle. One or more users may use the second UI element to adjust the first zone configuration and/or select a different zone configuration. For example, the one or more users may use the second UI element to select a second zone configuration. In response to the selection, the vehicle entertainment system may change from outputting audio content according to the first zone configuration to outputting audio content according to the second zone configuration.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
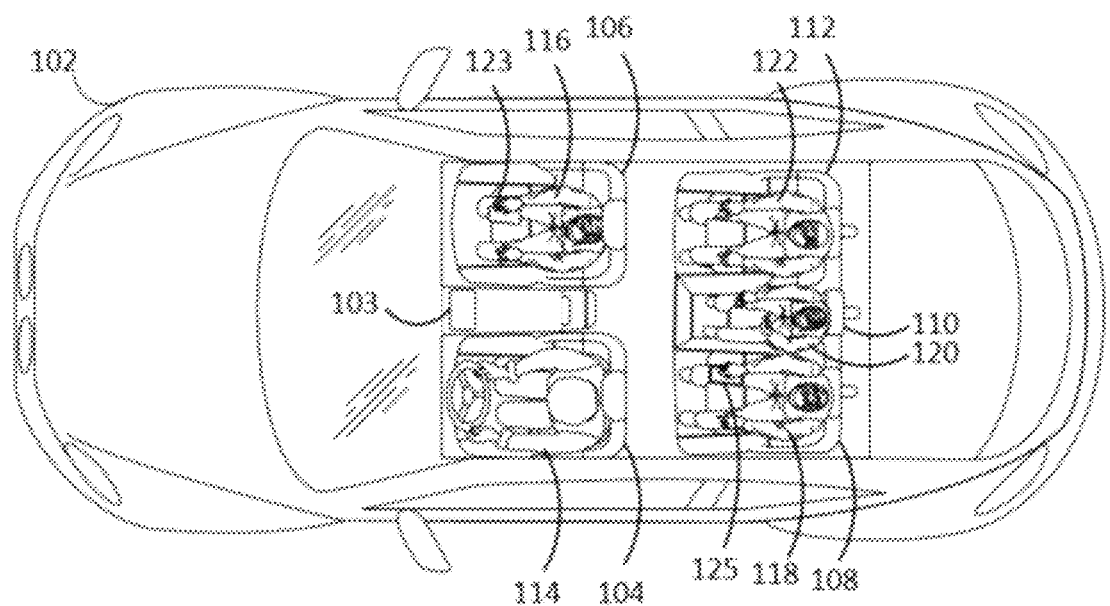
FIGS. 1A-1B show illustrative diagrams of a system for providing personalized audio for different users in a vehicle, in accordance with embodiments of the disclosure.
Figure 1B:
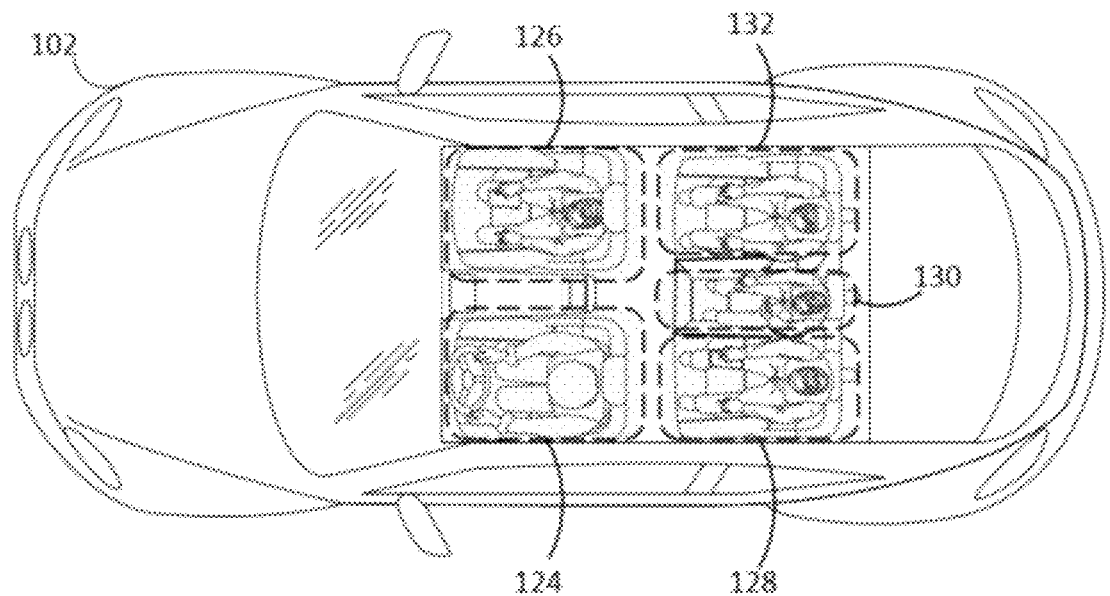

FIGS. 1A and 1B show illustrative diagrams of a system 100 for providing personalized audio for different users in a vehicle, in accordance with embodiments of the disclosure. In some embodiments, the system 100 comprises a vehicle 102. Although the vehicle 102 is shown as a car, other vehicles (e.g., vans, minivans, buses, trains, planes, helicopter, etc.) may also incorporate the systems and methods described herein. In some embodiments, the car comprises a display 103, a speaker array (e.g., speaker array 714), a first seat 104, a second seat 106, a third seat 108, a fourth seat 110, and a fifth seat 112. Although only one display is shown, any number of displays may be used. For example, there may be a first display in the front of the vehicle 102 and there may be a second display in the back of the vehicle 102. In some embodiments, the vehicle 102 comprises a display for each seat. Further, although five seats are shown, the vehicle 102 may comprise any number of seats. The speaker array may be located throughout the vehicle. For example, one or more speakers of the speaker array may be embedded into the ceiling of the vehicle. In another example, one or more speakers of the speaker array may be located within a dashboard of the vehicle. In another example, one or more speakers of the speaker array may be part of the one or more seats.

In some embodiments, the vehicle 102 uses one or more techniques to determine a plurality of positions associated with a plurality of users within the vehicle 102. For example, one or more seats within the vehicle 102 may comprise pressure sensors that detect when a user is sitting on a seat. The vehicle 102 may use the pressure sensors to determine that a first user 114 is sitting on the first seat 104, a second user 116 is sitting on the second seat 106, a third user 118 is sitting on the third seat 108, a fourth user 120 is sitting on the fourth seat 110, and a fifth user 122 is sitting on the fifth seat 112. In another example, the vehicle 102 may use one or more image sensors to determine the plurality of positions associated with the plurality of users within the vehicle 102. In some embodiments, the vehicle 102 uses other sensors (e.g., proximity sensors, infrared sensors, sound sensors etc.) to determine the plurality of positions associated with the plurality of users within the vehicle 102. In some embodiments, the vehicle 102 uses a combination of sensors to determine the plurality of positions associated with the plurality of users within the vehicle 102. For example, the vehicle 102 may detect five users using a plurality of pressure sensors. The vehicle 102 may then only detect four users using an image sensor. The vehicle 102 may determine that only four users are in the vehicle 102 and that a non-user object (e.g., backpack, bag, box, etc.) may have triggered the pressure sensor.

In some embodiments, the vehicle 102 determines the plurality of positions associated with the plurality of users within the vehicle 102 using one or more devices associated with the plurality of users. For example, the vehicle 102 may comprise a radio (e.g., UWB radio) and use the radio to detect the one or more devices associated with the plurality of users. The second user 116 may be holding a first device 123 and the third user 118 may be holding a second device 125. The first device 123 and the second device 125 may also comprise radios (e.g., UWB radios) capable of communicating with the radio of the vehicle 102. In some embodiments, the radio of the vehicle 102 uses one or more techniques to determine the locations of the first device 123 and the second device 125. For example, the radio of the vehicle may use Time-of-Flight (TOF), Time Difference of Arrival (TDoA), Two-Way Ranging (TWR), and/or similar such techniques to determine the locations of the first device 123 and the second device 125.

Although detecting the location of only two devices is described, any number of devices may be detected by radio of the vehicle 102. For example, each user of the five users may have a smartphone in their respective pocket. The radio of the vehicle 102 may be able to determine the plurality of positions associated with the five users by determining the locations of the five devices. Further, although only one radio of the vehicle 102 is described, the vehicle 102 may comprise more than one radio. For example, the vehicle 102 may comprise an antenna array. In some embodiments, the vehicle 102 uses the antenna array to determine two-dimensional (2D), and/or three-dimensional (3D) locations of one or more devices within the vehicle. For example, a first antenna of the antenna array may receive a signal from the first device 123 at a first angle and a second antenna of the antenna array may receive the signal from the first device 123 at a second angle. The vehicle 102 may use the first and second angles to determine the 2D and/or 3D location of the first device 123 within the vehicle 102.

In some embodiments, the vehicle 102 and one or more devices associated with one or more users establish a communication session. For example, a UWB radio of the vehicle 102 may detect a UWB radio of the first device 123 using a UWB discovery process according to UWB standards. The UWB discovery process may result in the first device 123 receiving a first UWB identifier associated with the vehicle 102 and may result in the vehicle 102 receiving a second UWB identifier associated with the first device 123. In some embodiments, the vehicle 102 and the first device 123 receive one or more session keys during the UWB discovery process. In some embodiments, the vehicle 102 and the first device 123 use the one or more session keys to establish secure communications.

In some embodiments, the vehicle 102 and/or the one or more devices associated with the one or more users request user confirmation. For example, the first device 123 may display a user confirmation notification when the first device 123 is within a threshold distance (e.g., five feet) from the vehicle 102. In some embodiments, the user confirmation notification is generated after the vehicle 102 and the first device 123 establish a communication session. In some embodiments, the user confirmation notification provides one or more selectable options. For example, the user confirmation notification may ask "Do you want to pair this device with the vehicle" and comprise a first selectable "no" option and a second selectable "yes" option. In some embodiments, a second user confirmation notification is displayed within the vehicle 102. In some embodiments, both the first user confirmation notification and the second user confirmation notification are displayed. In some embodiments, only one of the first user confirmation notification and the second user confirmation notification are displayed. In some embodiments, the user confirmation notifications prevent accidental pairing between the vehicle 102 and other devices.

In some embodiments, the display 103 within the vehicle 102 displays the second user confirmation notification. In some embodiments, the second user confirmation notification provides one or more selectable options. For example, the second user confirmation notification may provide a first option that allows the first device 123 to be registered with the vehicle 102 for a single session. The second user confirmation notification may provide a second option that allows the first device 123 to be permanently registered with the vehicle 123. Selection of the second option may result in the vehicle 102 saving an identity and network details associated with the first device 123 in one or more databases. The second user confirmation notification may provide a third option disallowing the first device 123 to be registered with the vehicle 123. The second user confirmation notification may provide a fourth option blacklisting the first device 123 so that the first device 123 cannot register with vehicle 102 at any point in the future.

In some embodiments, the vehicle 102 registers one or more devices associated with the plurality of users. In some embodiments, one or more devices share device data with the vehicle 102 as part of a registration process. For example, the first device 123 may share a first name (e.g., "Bobby's iPhone 12") associated with the first device 123. In another example, the first device 123 may share a MAC address associated with the first device 123. In another example, the first device 123 may share a network address for UWB, Bluetooth, and/or WiFi associated with the first device 123. In some embodiments, the vehicle 102 uses the received network address or network addresses to connect with the first device 123 at a later time. In some embodiments, the vehicle 102 registers the one or more devices for a single session (e.g., only storing the necessary information for a single session). In some embodiments, the vehicle 102 registers the one or more devices for more than a single session (e.g., storing information to identify and connect with the one or more devices for future sessions).

The vehicle 102 may store the device data received from the one or more devices in one or more databases. For example, the vehicle 102 may store device data received from the first device 123 in a registration database. The registration database may comprise a plurality of entries linking devices to device names, UWB addresses, network connection details, one or more flags, and/or similar such information. In some embodiments, the one or more flags may indicate whether the device data associated with a device (e.g., first device 123) should be removed after a single session or should be stored for future sessions. In some embodiments, the vehicle 102 also stores one or more encryption keys used for secure communication between one or more devices and the vehicle 102.

In some embodiments, the vehicle 102 compares the determined plurality of positions associated with the plurality of users with one or more zone configurations. In some embodiments, the vehicle 102 generates one or more zone configurations at the time of manufacture of the vehicle 102, at a time when a vehicle entertainment system is installed into the vehicle 102, at a calibration time, and/or at a similar such time. In some embodiments, the vehicle 102 receives one or more zone configurations from one or more devices (e.g., first device 123, second device 125, server, etc.). The vehicle 102 may store the one or more zone configurations in one or more databases. For example, the vehicle 102 may store the received zone configurations in a spatial zone database. In some embodiments, the zone configurations correspond to any number of zones and the zones may be of any shape or size. In some embodiments, the zones are uniform in size and shape, while in other embodiments, one or more zones are different in size and/or shape compared to one or more other zones.

In some embodiments, the vehicle 102 selects a first zone configuration of a plurality of zone configuration based on the plurality of positions associated with the plurality of users. The first zone configuration may comprise a first zone 124, a second zone 126, a third zone 128, a fourth zone 130, and a fifth zone 132. In some embodiments, the vehicle 102 selects the first zone configuration because at least one user of the plurality of users is located in each zone of the first zone configuration. In some embodiments, the vehicle 102 selects the zone configuration with the fewest number of zones where at least one user is in each zone. In some embodiments, the vehicle 102 selects the zone configuration where the number of zones equals the number of users.

The vehicle 102 may output personalized audio based on the selected zone configuration. For example, if the first zone configuration is selected, the vehicle 102 may output a first piece of audio content to the first zone 124, a second piece of audio content to the second zone 126, a third piece of audio content to the third zone 128, a fourth piece of audio content to the fourth zone 130, and a fifth piece of audio content to the fifth zone 132. The vehicle 102 may receive the pieces of audio from one or more sources. In some embodiments, the vehicle 102 receives the outputted piece of audio from one or more devices. For example, the vehicle 102 may receive the first piece of audio from a server and output the first piece of audio to the first zone 124. In another example, the vehicle 102 may receive the second piece of audio from the first device 123 and stream the second piece of audio to the second zone 126. In some embodiments, the vehicle 102 receives one or more pieces of audio from a radio station. For example, the vehicle 102 may receive the third piece of audio from a radio station and then output the third piece of audio to the third zone 128. In some embodiments, the vehicle 102 stores one or more pieces of audio in a database. For example, the vehicle may store the fourth piece of audio in a content database and then output the fourth piece of audio to the fourth zone 130. In some embodiments, one or more pieces of the outputted piece of audio correspond to a personal playlist. For example, the vehicle 102 may receive the third piece of audio from a playlist associated with the third user 118 and then output the third piece of audio to the third zone 128. In some embodiments, the vehicle 102 outputs a piece of audio content (e.g., safety announcement, song, etc.) to all the zones.

In some embodiments, the vehicle 102 selects the zone configuration based on selected audio. For example, if the first user 114 and the second user 116 select (e.g., via the display 103, via one or more devices, via voice commands, etc.) the same piece of audio (e.g., first piece of audio), the vehicle 102 may select a zone configuration where first user 114 and the second user 116 are located within a single zone. In some embodiments, the vehicle 102 uses the positions of the first user 114 and the second user 116 to determine a zone configuration where the first user 114 and the second user 116 are located within a single zone. The vehicle 102 may output the first piece of audio to the zone where the first user 114 and the second user 116 are located. The vehicle may also output the third piece of audio to the third zone 128, the fourth piece of audio to fourth zone 130, and the fifth piece of audio to the fifth zone 132.

In some embodiments, the vehicle 102 uses a speaker array and beamforming techniques to focus the audio content so that each piece of audio content is discernable in the corresponding zone. In some embodiments, the vehicle 102 accesses one or more databases to focus the audio content. For example, the vehicle 102 may access a beamforming parameter database, which contains one or more beamforming parameters needed to focus an audio stream to a particular zone. In some embodiments, the zones and/or zone configurations are used to map the positions of the one or more users to one or more zones and are also used to define a volumetric space that the speaker array may be tuned to focus on. For example, the vehicle 102 may access the beamforming parameter database to determine a first set of parameters associated with the first zone 124. The vehicle 102 may use the first set of parameters to focus the audio (e.g., first piece of audio content) outputted by the speaker array (or a subset of speakers of the speaker array) to the first zone 124. In some embodiments, the vehicle 102 uses more than one technique to output audio. For example, the vehicle 102 may output audio to the front of the vehicle 102 using a stereo system and may output audio to back of the vehicle 102 using a beamforming system. In some embodiments, the vehicle 102 selects between multiple audio output methods (e.g., beamforming, stereo, etc.) based on the audio content being outputted, user input, and/or information received from one or more sensors. For example, the vehicle 102 may be outputting audio using a stereo system and then switch to outputting audio using a beamforming system after receiving a user input. In another example, the vehicle 102 may be outputting audio using a beamforming system and then switch to outputting audio using a stereo system after receiving an alert (e.g., amber alert).

In some embodiments, the beamforming parameter database comprises a plurality of entries associating one or more zones with weighting and time delay parameters necessary to tune the speaker array to produce audio in the corresponding one or more zones. For example, a first entry in the beamforming parameter database may correspond to the first zone 124. The first entry may comprise a zone ID associated with the first zone 124, one or more weight vectors corresponding to one or more speakers in the speaker array, and/or one or more delay vectors corresponding to one or more speakers in the speaker array. In some embodiments, the vehicle 102 uses parameters of the first entry to output the first piece of audio to the first zone 124.

One or more users may select audio for output by inputting one or more inputs. For example, the vehicle 102 may receive a first input when the first user 114 selects the first piece of audio content and the first zone 124 using the display 103. The vehicle 102 may receive a second input when the second user 116 selects the second piece of audio content and the second zone 126 using the display 103. In response to receiving the first input and the second input, the vehicle 102 may output the first piece of audio content to the first zone 124 using beamforming and may output the second piece of audio content to the second zone 126 using beamforming. In another example, the vehicle 102 may receive a first input when the second user 116 selects the second piece of audio content and the second zone 126 using the first device 123. The vehicle 102 may receive a second input when the third user 118 selects the third piece of audio content and the third zone 128 using the second device 125. In response to receiving the first input and the second input, the vehicle 102 may output the second piece of audio content to the second zone 126 using beamforming and may output the third piece of audio content to the third zone 128 using beamforming.

In some embodiments, one or more users control the outputted audio by inputting additional inputs. For example, the vehicle 102 may receive an additional input when the first user 114 selects a new piece of audio content and the first zone 124 using the display 103. In response to receiving the additional input, the vehicle 102 may stop outputting the first piece of audio content to the first zone 124 and start outputting the new piece of audio content to the first zone 124. In another example, the vehicle 102 may receive an additional input when the second user 116 inputs a command (e.g., pause, skip, fast forwarded, rewind, increase volume, decrease volume) and the second zone 126 using the display 103 or the first device 123. In response to receiving the additional input, the vehicle 102 may execute the received command on the audio being outputted in the selected zone. In some embodiments, only certain users may select audio for output and/or control the outputted audio. For example, two parents may be riding in the vehicle 102 with three children where the parents do not want the children to be able to select and/or control audio outputted in one or more zones. The parents may also want to be able to select and/or control audio outputted in the children's zones. In some embodiments, the parents may select one or more modes (e.g., "parent" mode). The one or modes may allow one or more users to select and/or control audio outputted in one or more zones. For example, if parent mode is selected, then the parents (e.g., first user 114 and second user 116) may select audio for output for the zones (e.g., third zone 128, fourth zone 130, and fifth zone) of the children (e.g., third user 118, fourth user 120, and fifth user 122). In another example, if parent mode is selected, then the parents (e.g., first user 114 and second user 116) may control (e.g., stop, pause, change, stop, etc.) the audio being outputted to the zones (e.g., third zone 128, fourth zone 130, and fifth zone) of the children (e.g., third user 118, fourth user 120, and fifth user 122). In some embodiments, the one or modes may prevent one or more users from selecting and/or controlling audio outputted in one or more zones. For example, if parent mode is selected, then the vehicle 102 may prevent the children (e.g., third user 118, fourth user 120, and fifth user 122) from controlling the audio being outputted in the zones (e.g., first zone 124 and second zone 126) of the parents (e.g., first user 114 and second user 116). In another example, if parent mode is selected, then the vehicle 102 may prevent the children (e.g., third user 118, fourth user 120, and fifth user 122) from controlling the audio being outputted to any of the zones. Although a parent/child relationship is described similar such modes (e.g., "rideshare" mode) may be used to prevent certain users (e.g., passengers) from selecting and/or controlling the audio outputted for one or more zones.

In some embodiments, the vehicle 102 provides increased privacy for the one or more users by providing personalized audio to different zones. For example, the vehicle 102 may be streaming audio received from the first device 123 to the second zone 126. The first device 123 may receive a phone call and/or a spoken text message. The vehicle 102 may be able to stream the phone call and/or the spoken text message to the second zone 126 and one or more other users (e.g., third user 118) may be unable to hear the phone call and/or the spoken text message due to the vehicle 102 beamforming the audio content to the second zone 126.

Figure 2A:
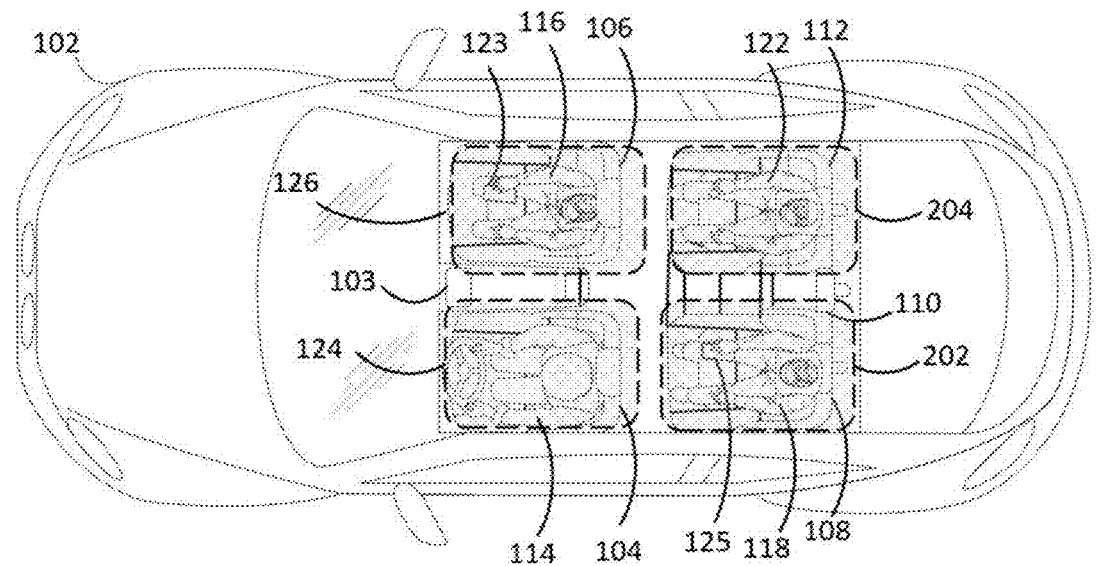
FIGS. 2A-2C show other illustrative diagrams of systems for providing personalized audio for different users in a vehicle, in accordance with embodiments of the disclosure.

In some embodiments, the vehicle 102 determines that one or more users has changed positions. In some embodiments, one or more users change positions by exiting the vehicle. For example, the fourth user 120 may exit the vehicle as shown in FIG. 2A. The vehicle 102 may determine that the fourth user 120 left the vehicle using one or more techniques. For example, the vehicle 120 may use a UWB transceiver to determine that a device associated with the fourth user 120 is no longer detected within the vehicle 102. In response to the vehicle 102 determining that the device associated with the fourth user 120 is no longer detected within the vehicle 102, the vehicle 102 may determine that fourth user 120 has exited the vehicle 102. In another example, the vehicle 120 may use a pressure sensor associated with the fourth seat 110 to determine that the fourth user 120 is no longer sitting on the fourth seat 110. In response to the vehicle 102 determining that the fourth user 120 is no longer sitting on the fourth seat 110, the vehicle 102 may determine that fourth user 120 has exited the vehicle 102. In another example, the vehicle 120 may use an image sensor to determine that the fourth user 120 is no longer located in the fourth zone 130. In response to the vehicle 102 determining that the fourth user 120 is no longer located in the fourth zone 130, the vehicle 102 may determine that the fourth user 120 has exited the vehicle 102.

The vehicle 102 may dynamically update the zone configuration based on determining that the fourth user 120 has exited the vehicle. For example, the vehicle 102 may change the selected zone configuration from a first zone configuration (e.g., as displayed in FIG. 1) to a second zone configuration (e.g., as displayed in FIG. 2A). In some embodiments, the second zone configuration comprises the first zone 124, the second zone 126, a sixth zone 202, and a seventh zone 204. The vehicle 102 may change to the second zone configuration because of a plurality of zone configurations, the second zone configuration may have the fewest number of zones where at least one user is in each zone and only one user is in each zone configuration.

The vehicle 102 may then output audio content based on the updated zone configuration. For example, the vehicle 102 may output the first piece of audio content to the first zone 124, the second piece of audio content to the second zone 126, the third piece of audio content to the sixth zone 202, and the fifth piece of audio content to the seventh zone 204. In some embodiments, the vehicle 102 repeats one or more steps described above to determine which audio to output to the plurality of zones of the second zone configuration. For example, the vehicle 102 may detect a first device associated with the first user 114 in the first zone 124, a second device associated with the second user 116 in the second zone 126, a third device associated with the third user 118 in the sixth zone 202, and a fifth device associated with the fifth user 122 in the seventh zone 204. In response to detecting the devices associated with the users in the zones, the vehicle 102 may output the first piece of audio content associated with the first user 114 to the first zone 124, the second piece of audio content associated with the second user 116 to the second zone 126, the third piece of audio content associated with the third user 118 to the sixth zone 202, and the fifth piece of audio content associated with the fifth user 122 to the seventh zone 204.

Figure 2B:
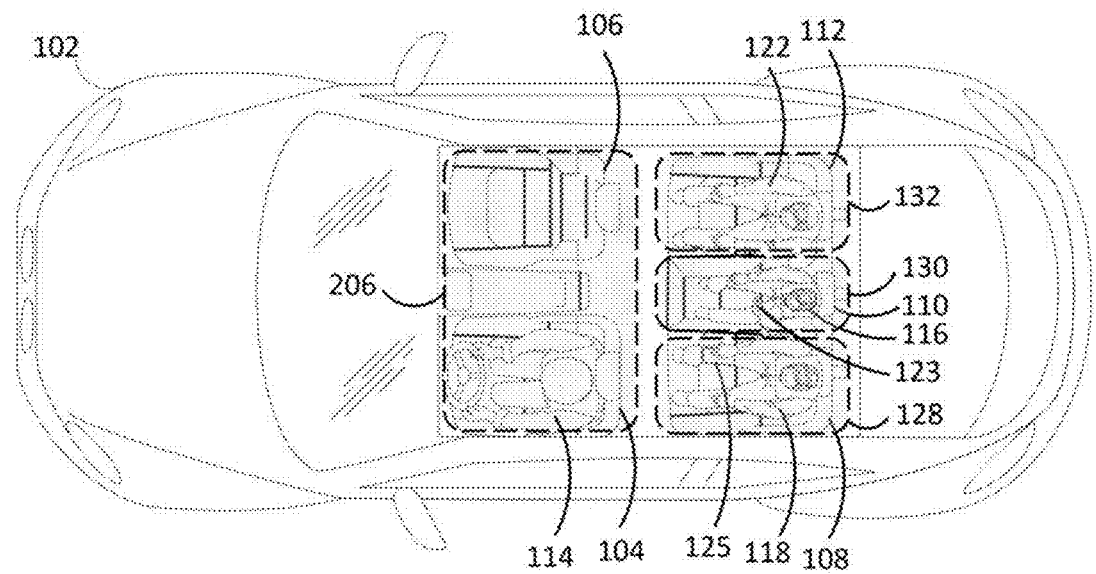

In some embodiments, one or more users changes positions within the vehicle 102. For example, the second user 116 may change from the second seat 106 to the fourth seat 110 as shown in FIG. 2B. The vehicle 102 may determine that the second user 116 changes seats using one or more techniques. For example, the vehicle 120 may use a UWB transceiver to determine that a device (e.g., first device 123) associated with the second user 116 has changed from a first location (e.g., second seat 106) to a second location (e.g., fourth seat 110). In response to the vehicle 102 determining that the first device 123 associated with the second user 116 has changed from the first location to the second location, the vehicle 102 may determine that the second user 116 has changed seats. In another example, the vehicle 120 may use an image sensor to determine that the second user 116 moved from the second seat 106 to the fourth seat 110.

In some embodiments, the vehicle 102 dynamically updates the zone configuration based on determining that one or more users have changed positioned. For example, the vehicle 102 may change the selected zone configuration from a second zone configuration (e.g., as displayed in FIG. 2A) to a third zone configuration (e.g., as displayed in FIG. 2B). In some embodiments, the third zone configuration comprises, the third zone 128, the fourth zone 130, the fifth zone 132, and an eighth zone 206. The vehicle 102 may change to the third zone configuration because of the plurality of zone configurations, the third zone configuration may have the fewest number of zones where at least one user is in each zone and only one user in each zone.

The vehicle 102 may then output audio content based on the updated zone configuration. For example, the vehicle 102 may output the first piece of audio content to the eighth zone 206, the second piece of audio content to the fourth zone 130, the third piece of audio content to the third zone 128, and the fifth piece of audio content to the fifth zone 132. In some embodiments, the vehicle 102 repeats one or more steps described above to determine which audio to output to the plurality of zones of the third zone configuration. For example, the vehicle 102 may detect a first device associated with the first user 114 in the eighth zone 206, a second device associated with the second user 116 in the fourth zone 130, a third device associated with the third user 118 in the third zone 118, and a fifth device associated with the fifth user 122 in the fifth zone 132. In response to detecting the devices associated with the user in the zones, the vehicle 102 may output the first piece of audio content associated with the first user 114 to the eighth zone 206, the second piece of audio content associated with the second user 116 to the fourth zone 130, the third piece of audio content associated with the third user 118 to the third zone 128, and the fifth piece of audio content associated with the fifth user 122 to the fifth zone 132.

Figure 2C:
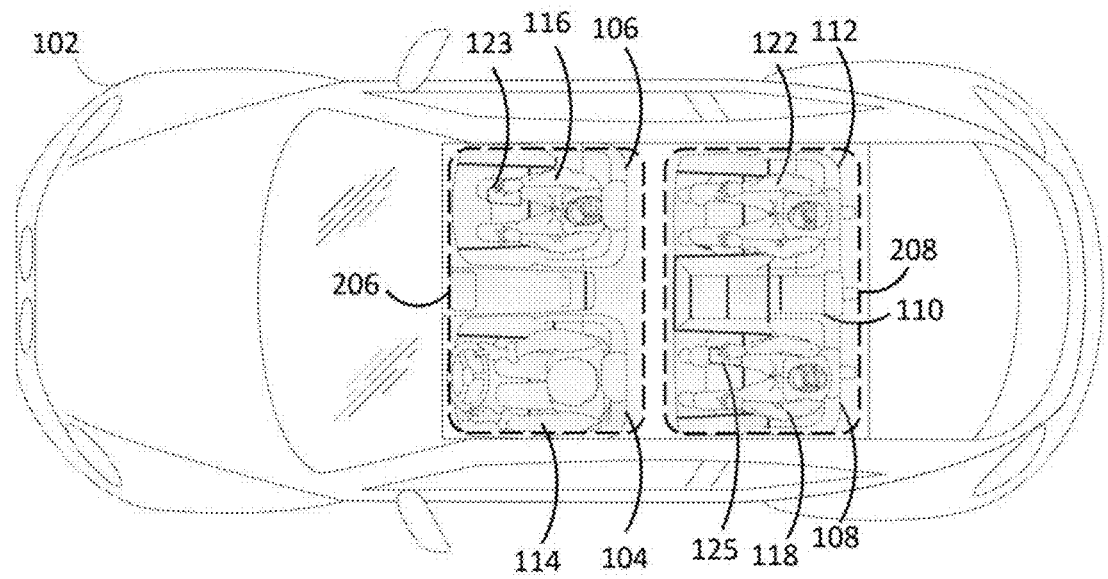

In some embodiments, the vehicle 102 dynamically updates the zone configuration based on a received input. For example, the vehicle 102 may receive an input from a display (e.g., display 103), one or more devices (e.g., first device 123), and/or a microphone. In some embodiments, the input may correspond to a zone configuration request. For example, the input may request a zone configuration where the first user 114 and the second user 116 are in a single zone and the third user 118 and the fifth user 122 are in a separate single zone. In response to the input, the vehicle 102 may change the selected zone configuration from the second zone configuration (e.g., as displayed in FIG. 2A) to a fourth zone configuration (e.g., as displayed in FIG. 2C). In some embodiments, the fourth zone configuration comprises the eighth zone 206 and a ninth zone 208. In some embodiments, the vehicle 102 may change to the fourth zone configuration because of the plurality of zone configurations, the fourth zone configuration has the fewest number of zones where the first user 114 and the second user 116 are in a single zone and the third user 118 and the fifth user 122 are in a separate single zone. In some embodiments, the vehicle 102 uses position information related to the users in addition to the received input to select the fourth zone configuration from the plurality of zone configurations.

The vehicle 102 may then output audio content according to the updated zone configuration. For example, the vehicle 102 may output the first piece of audio content to the eighth zone 206 and output the third piece of audio content to the ninth zone 208. In some embodiments, the vehicle 102 repeats one or more steps described herein to determine which audio to output to the plurality of zones of the fourth zone configuration. For example, the vehicle 102 may detect a first device associated with the first user 114 in the eighth zone 206 and detect a second device associated with the third user 118 in the ninth zone 208. In response to detecting the devices associated with the user in the zones, the vehicle 102 may output the first piece of audio content associated with the first user 114 to the eighth zone 206 and output the third piece of audio content associated with the third user 118 to the ninth zone 208.

In some embodiments, the vehicle 102 uses the received input to determine which audio to output to the plurality of zones of the fourth zone configuration. For example, the received input may identify a sixth piece of audio for the zone comprising the first user 114 and the second user 116 and may identify a seventh piece of audio for the zone comprising the third user 118 and the fifth user 122. In response to the received input, the vehicle 102 may output the sixth piece of audio content to the eighth zone 206 and output the seventh piece of audio content to the ninth zone 208.

Figure 3A:
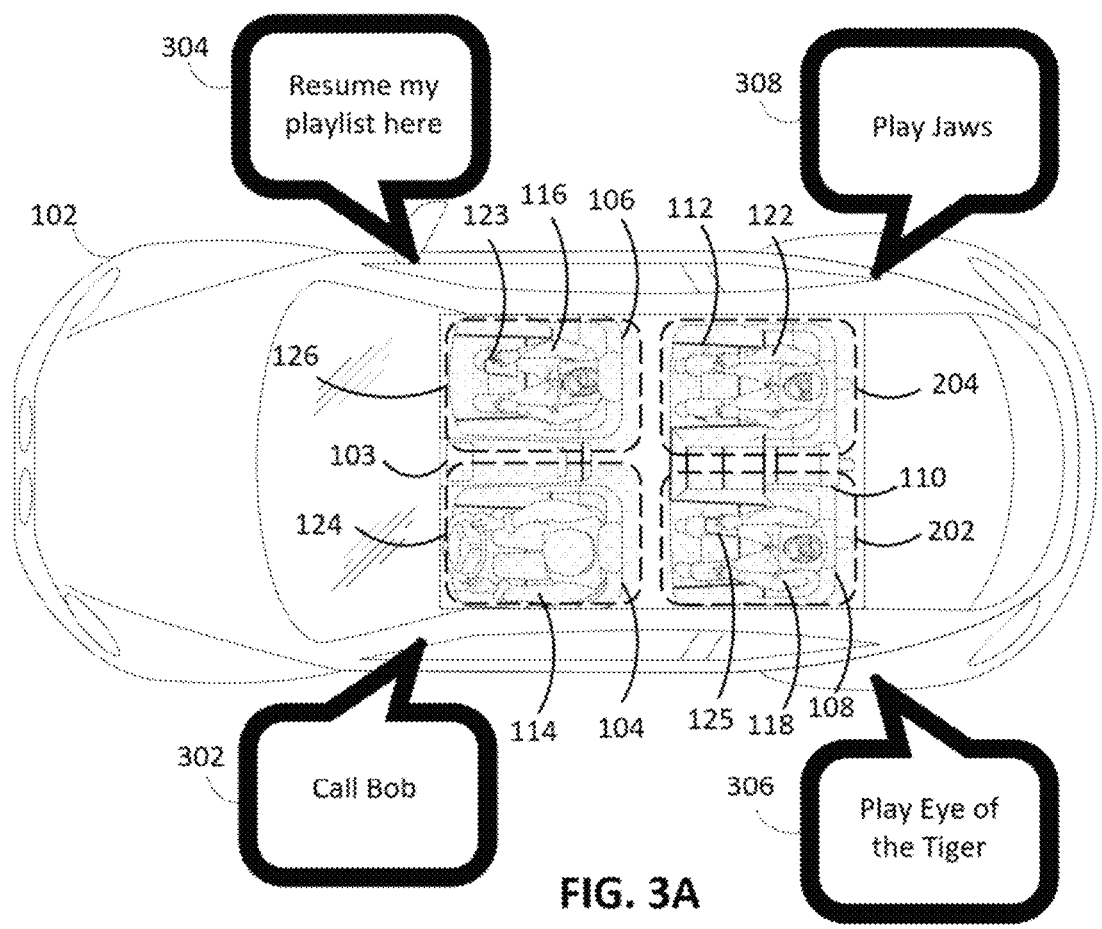
FIGS. 3A-3B show other illustrative diagrams of systems for providing personalized audio for different users in a vehicle, in accordance with embodiments of the disclosure.

In some embodiments, one or more users may utter one or more commands as shown in FIG. 3A. For example, the first user 114 may utter a first command 302, the second user 116 may utter a second command 304, the third user 118 may utter a third command 306, and the fifth user 122 may utter a fourth command 308. In some embodiments, the vehicle 102 detects the one or more commands using a beamforming microphone array (e.g., microphone array 716).

The vehicle 102 may use the beamforming microphone array and the one or more commands to select a zone configuration. For example, a beamforming microphone array can be used to determine the origin of a sound. The vehicle 102 may use the beamforming microphone array to determine one or more origins corresponding to the one or more detected commands. The vehicle 102 may then determine that the one or more origins of the one or more detected commands corresponds to positions of one or more users within the vehicle. For example, the vehicle 102 may determine that the first command 302 originated from a user (e.g., first user 114) sitting in the first seat 104, the second command 304 originated from a user (e.g., second user 116) sitting in the second seat 106, the third command 306 originated from a user (e.g., third user 118) sitting in the third seat 108, and the fourth command 308 originated from a user (e.g., fifth user 122) sitting in the fifth seat 112. The vehicle 102 may then use the plurality of position associated with the plurality of users to select a zone configuration (e.g., second zone configuration) as described above. For example, the vehicle may select the second zone configuration because of the plurality of zone configurations, the second zone configuration may have the fewest number of zones where at least one user is in each zone and only one user is in each zone.

In some embodiments, the vehicle 102 associates one or more of the commands with one or more zones where the one or more commands originated. For example, the vehicle 102 may associate the first command 302 with the first zone 124, the second command 304 with the second zone 126, the third command 306 with the sixth zone 202, and the fourth command 308 with the seventh zone 204. The vehicle 102 may then output audio content to the zones associated with the commands. For example, the vehicle 102 may output a first piece of audio (e.g., phone conversation with Bob) to the first zone 124 and a second piece of audio (e.g., song on a playlist of the second user 116) to the second zone 126. In some embodiments, one or more commands may control the audio content outputted in one or more zones. For example, the third user 118 may issue a command (e.g., "pause," "play," "skip," "fast forward," "rewind," "switch content," "increase volume," "turn off," "end call," etc.) that changes the audio content outputted in the sixth zone 202. In some embodiments, any of the commands described herein may control audio content outputted in more than one zone. For example, the first user 114 may utter "turn off all audio" and the vehicle 102 will stop outputting audio content to all zones. In another example, the second user 116 may utter "share my music with everyone" and the vehicle 102 will output the audio content outputted in the second zone 126 to all zones. In another example, the first user 114 may utter "turn off audio in the back of the car" and the vehicle 102 will stop outputting audio content to the back (e.g., sixth zone 202, seventh zone 204) of the vehicle 102 and continuing outputting audio content to the front (e.g., first zone 124, second zone 126) of the vehicle 102.

In some embodiments, the vehicle 102 uses voice recognition software to determine audio content referenced by the one or more commands. For example, the second command 304 comprises the term "my playlist." The vehicle 102 may use the microphone display to determine that the second command 304 originated from the second zone 126. In some embodiments, the vehicle 102 accesses one or more databases (e.g., spatial zone database) to identify a profile associated with a user (e.g., second user 116) located in the second zone 126. In some embodiments, the vehicle 102 uses one or more sensors (e.g., image sensor) to identify the second user 116 and accesses the profile associated with the second user 116 in response to identifying the second user 116. In some embodiments, the vehicle 102 detects the first device 123 located in the zone (e.g., second zone 126) where the second command 304 originated. The one or more databases may associate the first device 123 with the profile of the second user 116. The vehicle 102 may access the profile associated with the second user 116 in response to detecting the first device 123 in the zone where the second command 304 originated.

In some embodiments, one or more profiles comprise audio content associated with a user. For example, a first profile may comprise playlists, user settings, user preferences, identifying information, and/or similar such information related to the first user 114. In some embodiments, the vehicle 102 receives one or more profiles from one or more devices. For example, the vehicle 102 may access one or more servers comprising one or more databases including one or more profiles associated with one or more users. In another example, a device (e.g., first device 123) may transmit one or more profiles to the vehicle. In some embodiments, one or more users input profile information using the display 103. In some embodiments, the vehicle comprises storage (e.g., storage 708) and stores the one or more profiles using said storage.

In some embodiments, the vehicle 102 uses voice recognition software and/or similar such software to determine a zone keyword referenced by the one or more commands. Zone keywords (e.g., "here," "in the front," "back," "left," "right," "zone 1," "my zone," "entire car," and/or similar such words) may comprise any type of position identifier related to a position within the vehicle 102. For example, the second command 304 comprises the word "here." In some embodiments, the vehicle 102 outputs the second piece of audio content (e.g., song on the playlist of the second user 116) to the second zone 126 because the second command 304 comprises the word "here." In some embodiments, the vehicle 102 determines that one or more commands correspond to a display. For example, the vehicle 102 may determine that the fourth command 308 references a piece of media content (e.g., "Jaws") that has video data associated with the piece of media content. The vehicle 102 may display the video component of the movie "Jaws" on a display (e.g., display 103) and output the audio component of the movie "Jaws" using the speaker array to the seventh zone 204.

Figure 3B:
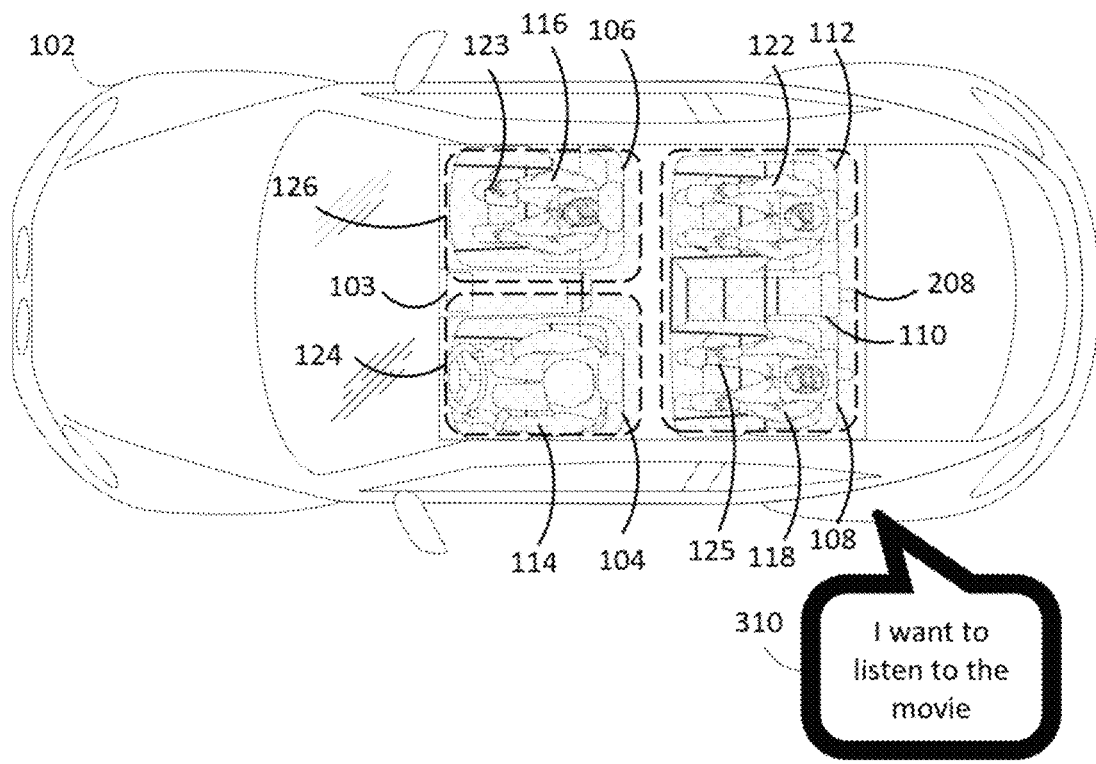

In some embodiments, the vehicle 102 may dynamically update the zone configuration based on one or more commands. For example, the vehicle 102 may change the selected zone configuration from the second zone configuration (e.g., as displayed in FIG. 3A) to a fifth zone configuration (e.g., as displayed in FIG. 3B) based on a fifth command 310. In some embodiments, the fifth zone configuration comprises the first zone 124, the second zone 126, and the ninth zone 208. The vehicle 102 may change to the fifth zone configuration because the fifth command 310 indicates that the user (e.g., third user 118) located in the third zone 202 wants to listen to the same audio content (e.g., "Jaws" audio) that is playing in the fifth zone 204. In some embodiments, the vehicle 102 determines the origin of the fifth command 310 and selects the fifth zone configuration based on the positions of the users and the desired audio content. The vehicle 102 may then output audio content based on the fifth zone configuration. For example, the vehicle 102 may output the first piece of audio content to the first zone 124, the second piece of audio content to the second zone 126, and a third piece of audio content (e.g., "Jaws" audio) to the ninth zone 208. In some embodiments, the vehicle 102 may change the selected zone configuration from the fifth zone configuration (e.g., as displayed in FIG. 3B) to the second zone configuration (e.g., as displayed in FIG. 3A) based on a sixth command. For example, the sixth command may indicate that the third user 118 wants to listen to the audio content (e.g., "Jaws" audio) in a different language. In response to the determining that the third user 118 and the fifth user 122 want to listen to different audio content, the vehicle 102 may output audio content based on the second zone configuration. For example, the vehicle 102 may output the first piece of audio content to the first zone 124, the second piece of audio content to the second zone 126, an eighth piece of audio content (e.g., "Jaws" audio in the second language) to the sixth zone 202, and the third piece of audio content (e.g., "Jaws" audio in the first language) to the seventh zone 204. Accordingly, the third user 118 and the fifth user 122 can both watch the same piece of media (e.g., "Jaws") while listening to the audio in two different languages.

In some embodiments, the vehicle 102 may associate the one or more commands with one or more users. For example, the vehicle 102 may have access to a database of voice signatures. The vehicle 102 may receive the first command 302 using one or more microphones. The vehicle 102 may then use voice recognition software to compare the first command 302 with the database of voice signatures. The vehicle 102 may determine that the first command 302 matches a voice signature corresponding to the first user 114. The vehicle 102 may then determine the location of the first user 114 within the vehicle 102 using any of the techniques described herein. For example, the vehicle 102 may detect a device associated with the first user 114 located on or near the first seat 104. Accordingly, the vehicle 102 may determine that the first user 114 is located in the first seat 104. The vehicle 102 may then output a piece of audio content (e.g., phone conversation with Bob), to the first zone 124 based on determining that the first command 302 corresponds to the first user 114 and determining that the first user 114 is located within the first zone 124. In some embodiments, users may be allowed to select audio for output for one or more zones. For example, the first user 114 may request that the vehicle 102 outputs audio playing in the first zone 124 to the second zone 126. In another example, the first user 114 may request that the vehicle 102 outputs audio playing in the second zone 126 to the first zone 126. In another example, the first user 114 may request that the vehicle 102 outputs audio playing in the third zone 128 to the fourth zone 130. In some embodiments, one or more users may be allowed to manipulate audio being outputted. For example, the first user 114 may request that the vehicle 102 outputs audio playing in the third zone 128 to the fourth zone 130 and the fourth user 120 may request that the vehicle 102 restart the audio being played in the fourth zone 130 from the beginning.

Figure 4A:
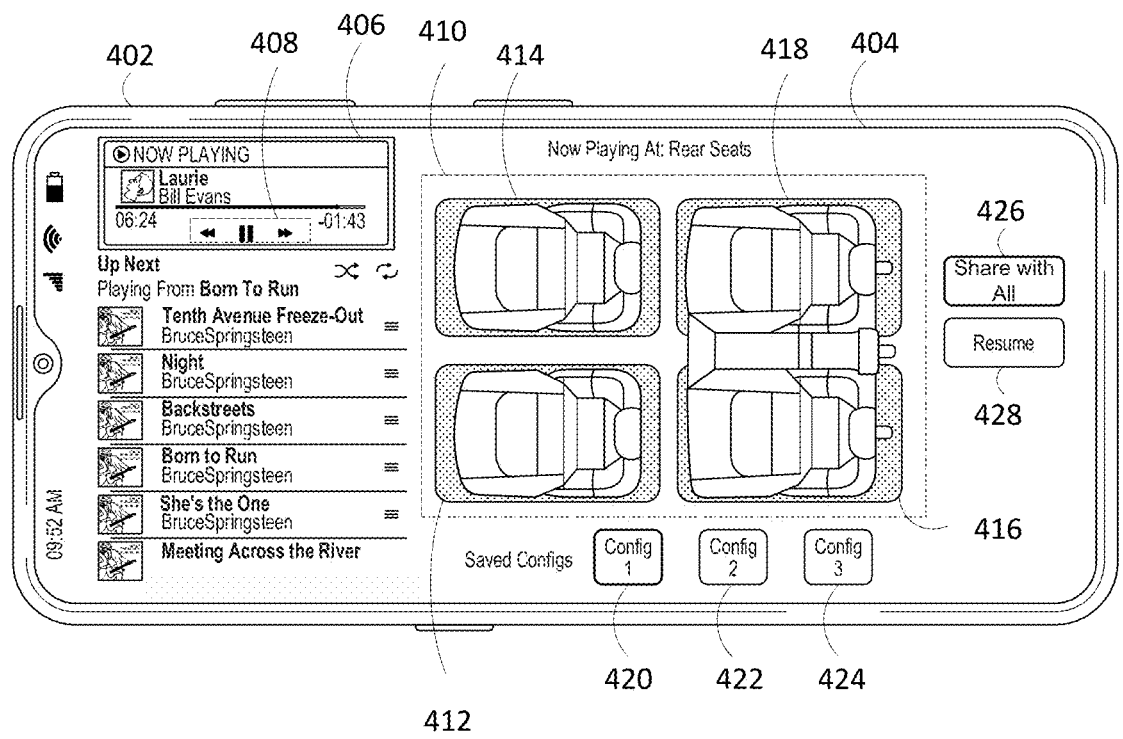
FIGS. 4A-4B show illustrative diagrams of UIs used for providing personalized audio for different users in a vehicle, in accordance with embodiments of the disclosure.
Figure 4B:
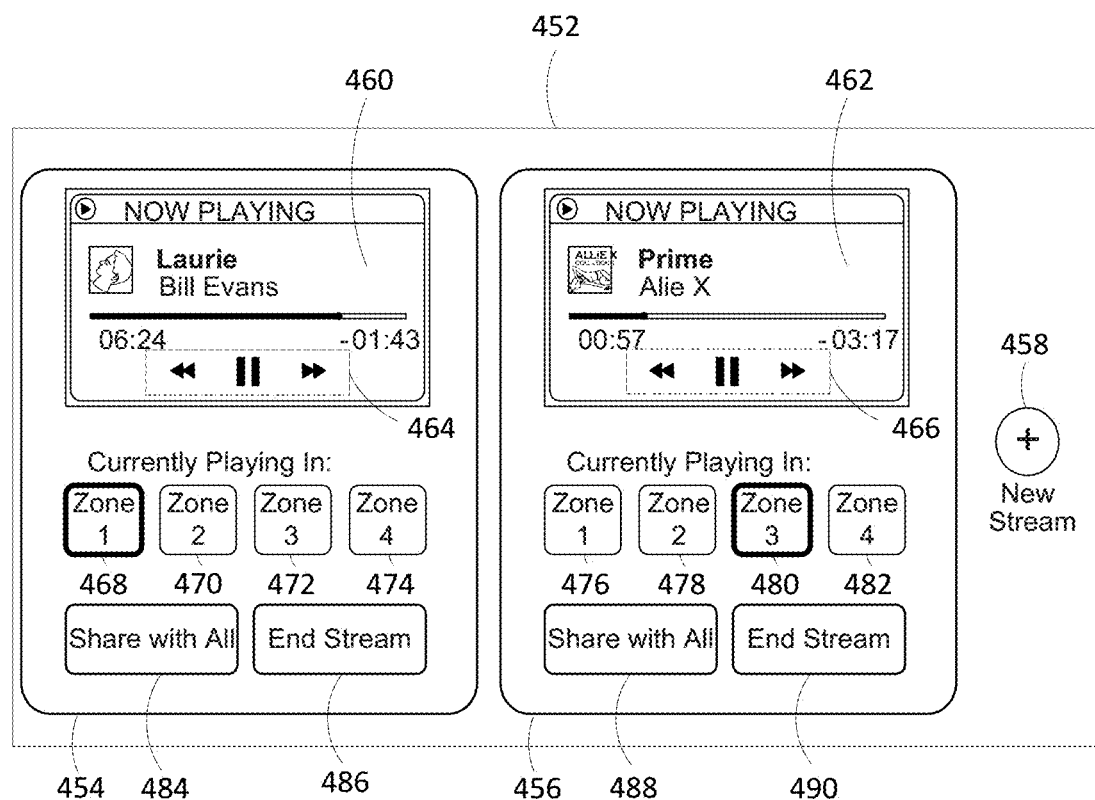

FIGS. 4A-4B show illustrative diagrams of UIs used for providing personalized audio for different users in a vehicle, in accordance with embodiments of the disclosure. FIG. 4A displays a device 402 displaying a first UI 400 on a first display 404. The device 402 may be a user equipment device (e.g., user equipment device 600, first device 123, etc.). In some embodiments, the first UI 400 is displayed on a vehicle's display (e.g., display 103). In some embodiments, the first UI 400 reflects audio content being output in one or more zones of a vehicle (e.g., vehicle 102). The first UI 400 may comprise a plurality of UI elements. For example, a first UI element 406 may be an audio content identifier (e.g., thumbnail image, title, artist name, etc.) corresponding to a first piece of audio content (e.g., "Laurie" by Bill Evans) being outputted by a vehicle entertainment system. In some embodiments, the first UI element 406 also comprises a progress bar corresponding to the first piece of audio content. In some embodiments, the progress bar is a separate UI element. In some embodiments, the first UI element 406 also comprises playback command options 408. In some embodiments, one or more playback command options 408 are separate UI elements. One or more users may use the playback command options 408 to input one or more playback commands. For example, the one or more users may pause, rewind, replay, fast forward, and/or skip the first piece of media by interacting with the first UI element 406. In some embodiments, a vehicle entertainment system adjusts the playback of the first piece of audio content in the one or more zones where the first piece of audio content is being outputted according to the playback command. For example, if the first piece of audio content is being outputted to a first zone and a user issues a pause command, the vehicle entertainment system may pause playback of the first piece of audio content in the first zone.

The first UI 400 may also comprise a second UI element 410 corresponding to one or more zone configurations. For example, the second UI element 410 may comprise a zone configuration (e.g., second zone configuration of FIG. 2B) comprising one or more zones, along with a depiction of the inside of a vehicle (e.g., vehicle 102). The second UI element 410 may display a depiction of a zone configuration comprising a depiction of a first zone 412, a depiction of a second zone 414, a depiction of a third zone 416, and a depiction of a fourth zone 418. In some embodiments, the depiction of the zone configuration and/or the depiction of the one or more zones are overlayed over the depiction of the inside of the vehicle.

One or more users may use the second UI element 410 to adjust the zone configuration and/or select a different zone configuration. For example, the one or more users may select the second UI element 410 and/or a portion of the second UI element 410. In some embodiments, the selection may correspond to removing a zone, combining one or more zones, adding one or more zones, and/or modifying one or more zones. In response to the user selection, a vehicle entertainment system may change from outputting audio content according to the displayed zone configuration to outputting audio content according to the updated zone configuration associated with the user selection. For example, the device 402 may transmit a zone configuration request including the updated zone configuration to the vehicle (e.g., vehicle 102) outputting audio associated with the first UI 400.

In some embodiments, the second UI element 410 indicates audio being outputted in one or more zones. For example, the first piece of audio may be outputted to the zone corresponding to the depiction of the third zone 416. The depiction of the third zone 416 may be distinguished in the first UI 400 to indicate that the first piece of audio is being outputted to the corresponding zone. For example, the depiction of the third zone 416 may have a different color, shape, size, texture, animation, transparency, etc. In another example, the first piece of audio may be outputted to the zones corresponding to the depiction of the third zone 416 and the zone corresponding to the depiction of the fourth zone 418. In such an example, the depiction of the third zone 416 and the depiction of the fourth zone 418 may have a different color, shape, size, texture, animation, transparency, and/or similar such distinguishing characteristic compared to the depiction of the first zone 412 and/or the depiction of the second zone 414.

In some embodiments, the first UI 400 also comprises a third UI element 420, a fourth UI element 422, and a fifth UI element 424. In some embodiments, the third UI element 420, the fourth UI element 422, and the fifth UI element 424 correspond to one or more zone configurations. For example, the third UI element 420 may correspond to a first zone configuration (e.g., second zone configuration displayed in FIG. 2A), the fourth UI element 422 may correspond to a second zone configuration (e.g., first zone configuration displayed in FIG. 1B), and the fifth UI element 424 may correspond to a third zone configuration (e.g., third zone configuration displayed in FIG. 2B). In some embodiments, one or more users may save zone configurations to the third UI element 420, the fourth UI element 422, and the fifth UI element 424. For example, a user may input one or more desired zones (e.g., via the second UI element 410) and then use the first UI 400 to save the inputted zones as a zone configuration corresponding to the third UI element 420. In such an example, whenever the user selects the third UI element 420, a vehicle entertainment system may output audio content according to the saved zone configuration. In another example, a user may modify one or more zone configurations to generate a new zone configuration. The user may then use the first UI 400 to save the new zone configuration as the zone configuration corresponding to the third UI element 420. In such an example, whenever the user selects the third UI element 420, a vehicle entertainment system may output audio according to the new zone configuration. In some embodiments, the zone configurations corresponding to the third UI element 420, the fourth UI element 422, and the fifth UI element 424 are provided by one or more databases.

In some embodiments, one of the elements of the first UI 400 are distinguished to indicate which zone configuration reflects the current audio content being outputted to the vehicle. For example, if the third UI element 420 corresponds to the zone configuration (e.g., second zone configuration displayed in FIG. 2A) being used to output content to the vehicle, then the third UI element 420 may have a different color, shape, size, texture, animation, transparency, and/or similar such distinguishing characteristic compared to the fourth UI element 422 and the fifth UI element 424.

In some embodiments, the first UI 400 also comprises a sixth UI element 426 and a seventh UI element 428. The sixth UI element 426 may allow one or more users to share audio content with other zones. For example, a first user may select the sixth UI element 426. In response to the first user selecting the sixth UI 426 element, a vehicle entertainment system may switch from outputting the first piece of audio content (e.g., "Laurie" by Bill Evans) to a first zone to outputting the first piece of audio content to all the zones in the vehicle. The seventh UI element 428 may allow one or more users to stop sharing audio content with other zones. For example, the first user may select the seventh UI element 428 (e.g., after selecting the sixth UI element 426). In response to the first user selecting the seventh UI 428 element, a vehicle entertainment system may switch from outputting the first piece of audio content (e.g., "Laurie" by Bill Evans) to all the zones, to only outputting the first piece of audio content to the first zone.

In some embodiments, one or more UI elements may not be available or may not be selectable for one or more users.

For example, two parents may be riding in the vehicle with two children where the parents do not want the children to have access to the zone configurations. In another example, a first user (e.g., driver) may be part of a rideshare company and pick up a second user (e.g., passenger). The drive may not want the passenger to have access to one or more zones in the driver's car. In some embodiments, each user is associated with a user profile comprising user information. User information may comprise authorization information associated with a user for one or more vehicles. For example, the two user profiles associated with the parents may indicate that the two parents are fully authorized while the two user profiles associated with the children may indicate that the two children are not fully authorized. In another example, the user profile associated with the driver may indicate that the driver is fully authorized while the user profile associated with the passenger may indicate that the passenger is not fully authorized. In some embodiments, only users (e.g., the parents, drivers, etc.) that are fully authorized are able to change and/or modify zone configurations. For example, the two children and/or the passenger may not be able to select the third UI element 420, the fourth UI element 422, and/or the fifth UI element 424. In some embodiments, a different UI is provided to users that are not fully authorized (e.g., the two children, the passenger, etc.), wherein the different UI does not comprise one or more elements (e.g., third UI element 420, fourth UI element 422, fifth UI element 424, etc.) that the users are not authorized to select.

FIG. 4B displays a second UI 450 displayed on a second display 452. In some embodiments, the second display 452 is the same as the first display 404. In some embodiments, the second display 452 is part of a user equipment device (e.g., user equipment device 600, first device 123, etc.). In some embodiments, the second UI 450 is displayed on vehicle's display (e.g., display 103). In some embodiments, the second UI 450 comprises a plurality of UI elements. For example, the second UI 450 may comprise a first audio stream identifier 454 corresponding to a first audio stream and a second audio stream identifier 456 corresponding to a second audio stream. In some embodiments, each audio stream identifier reflects audio content being output in one or more zones of a vehicle (e.g., vehicle 102). For example, the first audio stream identifier 454 may reflect a first piece of audio content (e.g., "Laurie" by Bill Evans) being output in a first zone and the second audio stream identifier 456 may reflect a second piece of audio content (e.g., "Prime" by Alie X) being output in a third zone.

In some embodiments, one of the UI elements provided by the second UI 450 is a new stream option 458. The new stream option 458 may be a selectable option for generating a new stream. For example, a user may select (e.g., by tapping on the new stream option 458) the new stream option 458. In response to receiving the selection of the new stream option 458, the second UI 450 may display a search interface for identifying a piece of audio content and/or a zone selector for selecting a zone to output the selected piece of audio. The user may then select a piece of audio content and/or a zone and the second UI 450 may display a third audio stream identifier corresponding to the user selections.

In some embodiments, a first audio content identifier 460 and a second audio content identifier 462 are UI elements provided by the second UI 450. The first audio content identifier 460 may correspond to a first piece of audio content (e.g., "Laurie" by Bill Evans) being streamed by the first audio stream and the second audio identifier 462 may correspond to a second piece of audio content (e.g., "Prime"

by Ali X) being streamed by the second audio stream. In some embodiments, the first audio content identifier 460 comprises a thumbnail image, title, artist information, and/or similar such information related to the first piece of audio content. In some embodiments, the second audio content identifier 462 comprises a thumbnail image, title, artist information, and/or similar such information related to the second piece of audio content. In some embodiments, the first audio content identifier 460 comprises a first progress bar corresponding to the playback of the first audio stream and the second audio content identifier 462 comprises a second progress bar corresponding to the playback of the second audio stream.

In some embodiments, the first audio content identifier 460 comprises a first set of playback command options 464 and the second audio content identifier 462 comprises a second set of playback command options 466. One or more users may use the first set of playback command options 464 and/or the second set of playback command options 466 to input playback commands. For example, the one or more users may pause the first audio stream by interacting (e.g., selecting the pause command) with the first set of playback command options 464.

The audio stream identifiers may comprise one or more zone options. For example, the first audio stream identifier 454 may comprise a first zone option 468, a second zone option 470, a third zone option 472, and a fourth zone option 474. The second audio stream identifier 456 may comprise a fifth zone option 476, a sixth zone option 478, a seventh zone option 480, and an eighth zone option 482. In some embodiments, each zone option corresponds to a zone in a zone configuration. For example, the first zone option 468 and the fifth zone option 476 may correspond to a first zone in a zone configuration (e.g., second zone configuration displayed in FIG. 2A), the second zone option 470 and the sixth zone option 478 may correspond to a second zone in the zone configuration, the third zone option 472 and the seventh zone option 480 may correspond to a third zone in the zone configuration, and the fourth zone option 474 and the eighth zone option 482 may correspond to a fourth zone in the zone configuration.

In some embodiments, the zone options correspond to the zones where the audio streams are outputted. For example, if the first zone option 468 is selected for the first audio stream, then the first audio stream is outputted to the zone (e.g., first zone) corresponding to the first zone option 468. In another example, if the first zone option 468 and the second zone option 470 are selected for the first audio stream, then the first audio stream is outputted to the zones (e.g., first zone and second zone) corresponding to the first zone option 468 and the second zone option 470. In some embodiments, one or more zone options are distinguished to indicate the zone or zones where the audio stream is being outputted. For example, the first zone option 468 may be bold to reflect the first audio stream being outputted in the first zone. In some embodiments, the zone options (e.g., first zone option 468) corresponding to zones (e.g., first zone) where the audio streams are being outputted have different color, shape, size, texture, animation, transparency, and/or similar such distinguishing characteristic compared to the zone options (e.g., second zone option 470) corresponding to zones (e.g., second zone) where the audio stream is not being outputted.

The audio stream identifiers may comprise one or more audio stream options. For example, the first audio stream identifier 454 may comprise a first audio stream option 484 and a second audio stream option 486. The second audio stream identifier 456 may comprise a third audio stream option 488 and a fourth audio stream option 490. In some embodiments, the first audio stream option 484 and/or the third audio stream option 488 allow one or more users to share audio content with other zones. For example, a first user may select the first audio stream option 484. In response to the first user selecting the first audio stream option 484, a vehicle entertainment system may switch from outputting the first piece of audio content (e.g., "Laurie" by Bill Evans) to a first zone to outputting the first piece of audio content to all the zones in the vehicle. In some embodiments, the second audio stream option 486 and/or the fourth audio stream option 490 allow one or more users to end one or more audio streams. For example, the first user may select the second audio stream option 486. In response to the first user selecting the second audio stream option 486, a vehicle entertainment system may stop outputting the first stream to the first zone.

Figure 5:
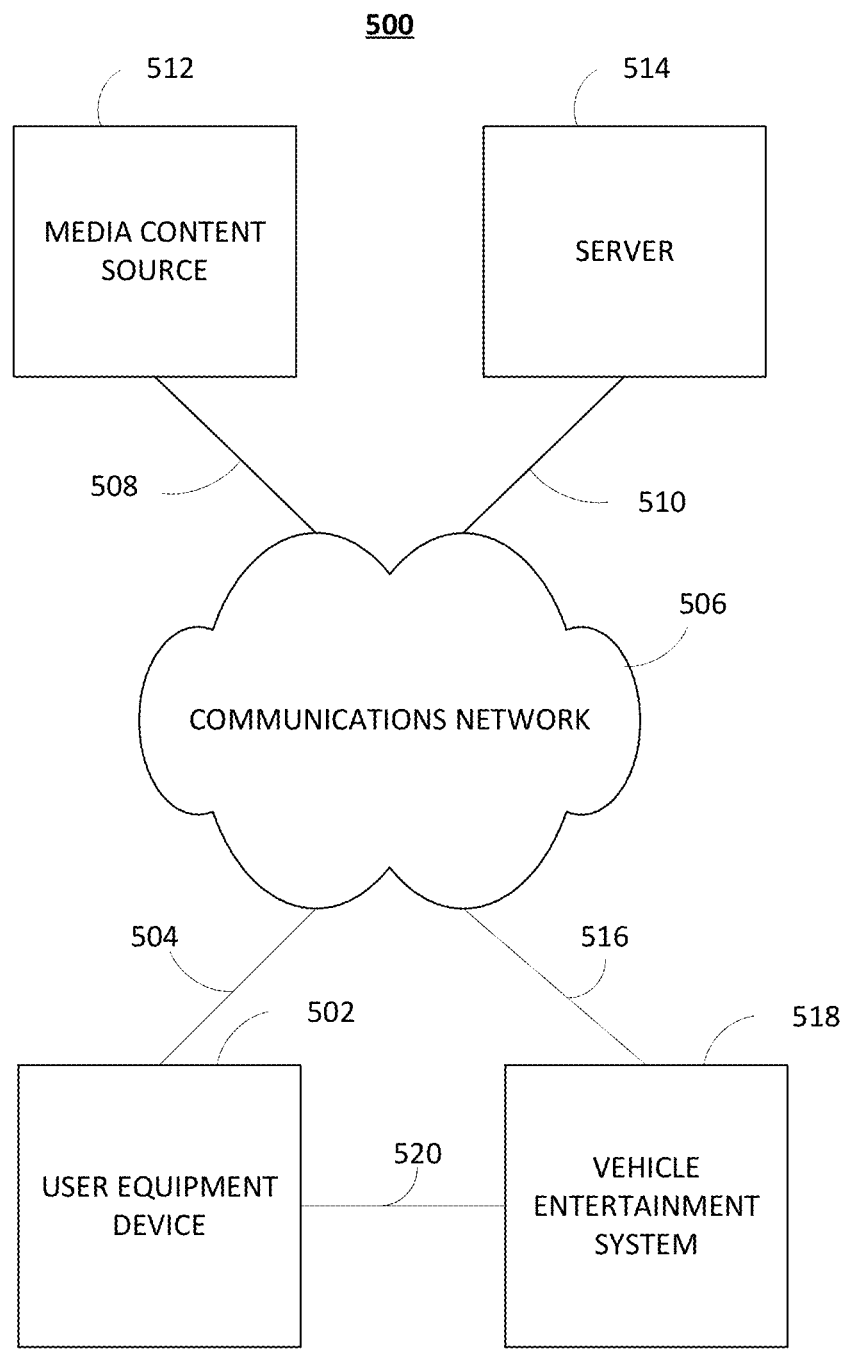
FIG. 5 shows an illustrative block diagram of a media system, in accordance with embodiments of the disclosure.
Figure 6:
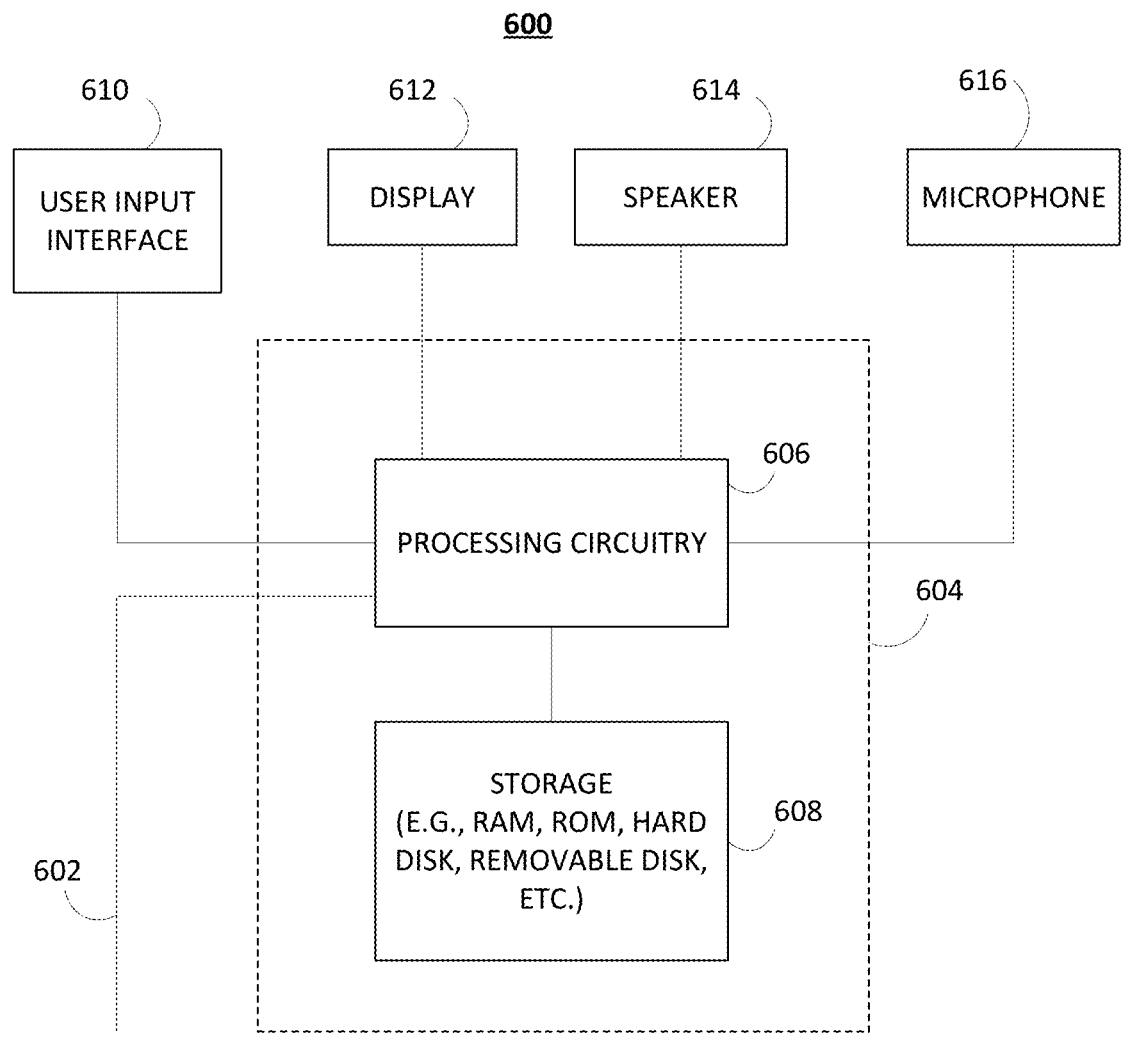
FIG. 6 shows an illustrative block diagram of a user equipment (UE) device system, in accordance with embodiments of the disclosure.
Figure 7:
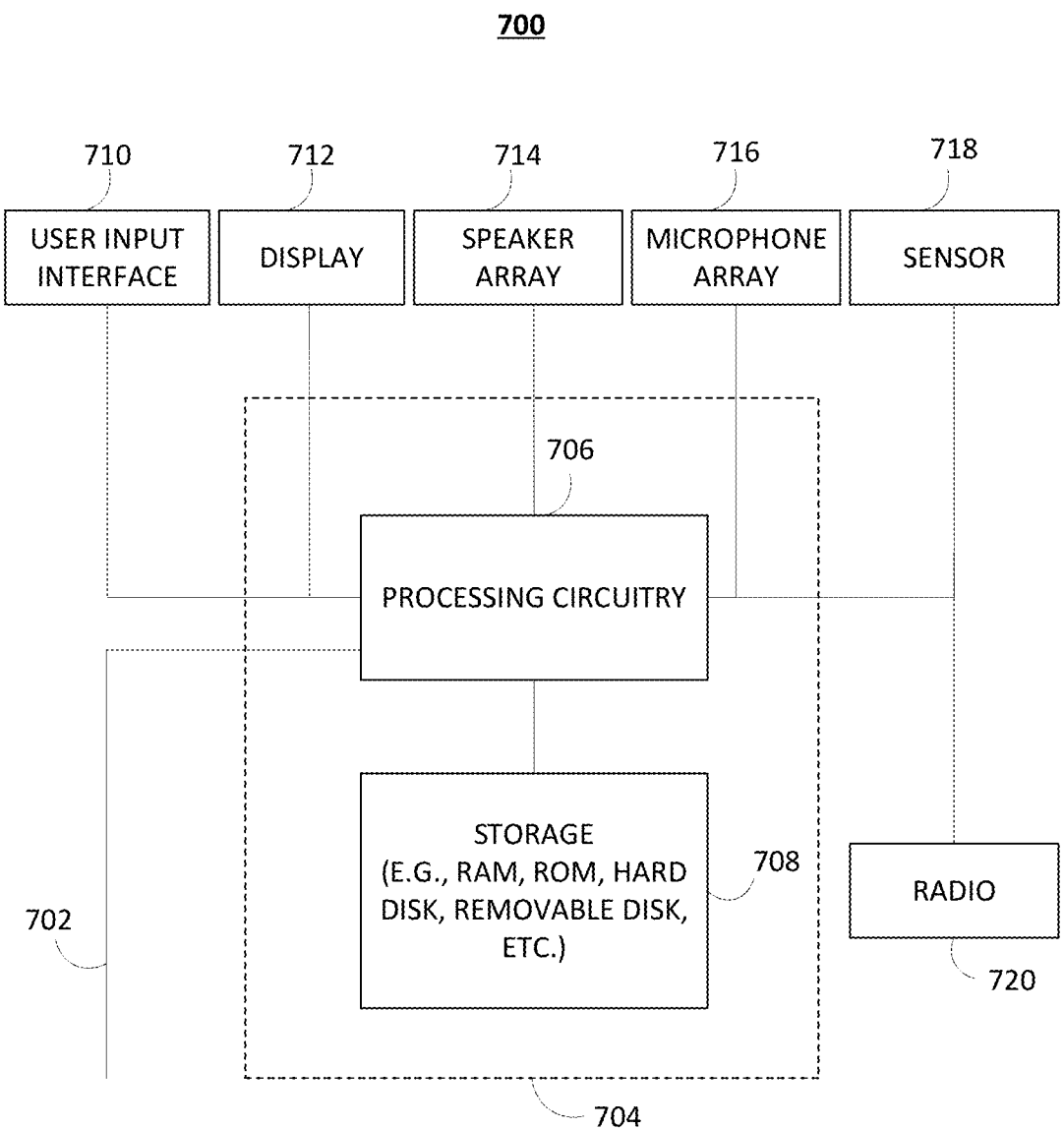
FIG. 7 shows an illustrative block diagram of a vehicle entertainment system, in accordance with embodiments of the disclosure.

FIGS. 5-7 describe example devices, systems, servers, and related hardware for providing personalized audio for different users in a vehicle, in accordance with some embodiments of the disclosure. In the system 500, there can be more than one user equipment device 502, but only one is shown in FIG. 5 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 506.

The system 500 may also comprise more than one vehicle entertainment system 518, but only one is shown in FIG. 5 to avoid overcomplicating the drawing. The user equipment devices and/or vehicle entertainment systems may be coupled to communications network 506. Namely, the user equipment device 502 is coupled to the communications network 506 via communications path 504 and the vehicle entertainment system 518 is coupled to the communications network 506 via communications path 516. The communications network 506 may be one or more networks including the Internet, a mobile phone network, mobile voice or data network (e.g., a 5G or LTE network), cable network, public switched telephone network, or other types of communications network or combinations of communications networks. The communications network 506 may connected to a media content source through a third path 508 and may be connected to a server 514 through a fourth path 510. The paths may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, the paths may be wireless paths.

Communications between the devices may be provided by one or more communications paths but is shown as a single path in FIG. 5 to avoid overcomplicating the drawing. In an embodiment, there may be one or more paths (e.g., fifth path 518) between user equipment devices and vehicle entertainment systems, so that the devices may communicate directly with each other via communications paths, as well as other short-range point-to-point communications paths, such as USB cables, IEEE 1394 cables, wireless paths (e.g., UWB, Bluetooth, infrared, IEEE 802-11x, etc.), or other short-range communication via wired or wireless paths. In an embodiment, the user equipment device 502 and the vehicle entertainment system 518 may also communicate with each other directly through an indirect path via the communications network 506.

The system 500 also includes media content source 512, and server 514, which can be coupled to any number of databases (e.g., media content database, user profile database, registration database, spatial zone database, beamforming parameter database, etc.) providing information to the user equipment devices and/or vehicle entertainment systems. The media content source 512 represents any computer-accessible source of content, such as a storage for media assets (e.g., video asset, audio asset), metadata, or, similar such information. The server 514 may store and execute various software modules to implement the providing of personalized audio for different users in a vehicle functionality.

FIG. 6 shows a generalized embodiment of a user equipment device 600, in accordance with some embodiments. In an embodiment, the user equipment device 600 is the same user equipment device 502 of FIG. 5. The user equipment device 600 may receive content and data via input/output (I/O) path 602. The I/O path 602 may provide content (e.g., broadcast programming, on-demand programming, Internet content, content available over a local area network (LAN) or wide area network (WAN), and/or other content) and data to control circuitry 604, which includes processing circuitry 606 and a storage 608. The control circuitry 604 may be used to send and receive commands, requests, and other suitable data using the I/O path 602. The I/O path 602 may connect the control circuitry 604 (and specifically the processing circuitry 606) to one or more communications paths. I/O functions may be provided by one or more of these communications paths but are shown as a single path in FIG. 6 to avoid overcomplicating the drawing.

The control circuitry 604 may be based on any suitable processing circuitry such as the processing circuitry 606. As referred to herein, processing circuitry 606 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of personalized audio for different users in a vehicle functionality can be at least partially implemented using the control circuitry 604. The providing of personalized audio for different users in a vehicle functionality described herein may be implemented in or supported by any suitable software, hardware, or combination thereof. The providing of personalized audio for different users in a vehicle functionality can be implemented on the user equipment, on remote servers, or across both.

In client/server-based embodiments, the control circuitry 604 may include communications circuitry suitable for communicating with one or more servers and/or vehicle entertainment systems that may at least implement the described providing of personalized audio for different users in a vehicle functionality. The instructions for carrying out the above-mentioned functionality may be stored on one or more vehicle entertainment systems and/or one or more servers. Communications circuitry may include a cable modem, an integrated service digital network (ISDN) modem, a digital subscriber line (DSL) modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 608 that is part of the control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 608 may also store any number of databases (e.g., media content database, user profile database, registration database, spatial zone database, beamforming parameter database, etc.). The storage 608 may be used to store various types of content described herein. Nonvolatile memory may also be used (e.g., to launch a boot-up routine and other instructions). Cloud-based storage, described in relation to FIG. 5, may be used to supplement the storage 608 or instead of the storage 608.

The control circuitry 604 may include audio generating circuitry and tuning circuitry, such as one or more analog tuners, audio generation circuitry, filters or any other suitable tuning or audio circuits or combinations of such circuits. The control circuitry 604 may also include scaler circuitry for upconverting and down converting content into the preferred output format of the user equipment device 600. The control circuitry 604 may also include digital-to-analog converter circuitry and analog-to-digital converter circuitry for converting between digital and analog signals. The tuning and encoding circuitry may be used by the user equipment device 600 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 608 is provided as a separate device from the user equipment device 600, the tuning and encoding circuitry (including multiple tuners) may be associated with the storage 608.

The user may utter instructions to the control circuitry 604, which are received by the microphone 616. The microphone 616 may be any microphone (or microphones) capable of detecting human speech. The microphone 616 is connected to the processing circuitry 606 to transmit detected voice commands and other speech thereto for processing.

The user equipment device 600 may optionally include an interface 610. The interface 610 may be any suitable user interface, such as a remote control, mouse, trackball, keypad, keyboard, touchscreen, touchpad, stylus input, joystick, or other user input interfaces. A display 612 may be provided as a stand-alone device or integrated with other elements of the user equipment device 600. For example, the display 612 may be a touchscreen or touch-sensitive display. In such circumstances, the interface 610 may be integrated with or combined with the microphone 616. When the interface 610 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 610 may be HDTV-capable. In some embodiments, the display 612 may be a 3D display.

The speakers 614 may be integrated with other elements of user equipment device 600 or may be one or more stand-alone units. In some embodiments, the speakers 614 may be dynamic speakers, planar magnetic speakers, electrostatic speakers, horn speakers, subwoofers, tweeters, and/or similar such speakers. In some embodiments, the control circuitry 604 outputs one or more audio signals to the speakers 614.

FIG. 7 shows a generalized embodiment of a vehicle entertainment system 700, in accordance with some embodiments. In an embodiment, the vehicle entertainment system 700 is the same vehicle entertainment system 518 of FIG. 5. The vehicle entertainment system 700 may receive content and data via I/O path 702. The I/O path 702 may provide content (e.g., broadcast programming, on-demand programming, Internet content, content available over a LAN or WAN, and/or other content) and data to control circuitry 704, which includes processing circuitry 706 and a storage 708. The control circuitry 704 may be used to send and receive commands, requests, and other suitable data using the I/O path 702. The I/O path 702 may connect the control circuitry 704 (and specifically the processing circuitry 706) to one or more communications paths. I/O functions may be provided by one or more of these communications paths but are shown as a single path in FIG. 7 to avoid overcomplicating the drawing.

The control circuitry 704 may be based on any suitable processing circuitry such as the processing circuitry 706. As referred to herein, processing circuitry 706 should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of personalized audio for different users in a vehicle functionality can be at least partially implemented using the control circuitry 704. The providing of personalized audio for different users in a vehicle functionality described herein may be implemented in or supported by any suitable software, hardware, or combination thereof. The providing of personalized audio for different users in a vehicle functionality can be implemented on the vehicle entertainment system 700, user equipment, and/or on remote servers.

In client/server-based embodiments, the control circuitry 704 may include communications circuitry suitable for communicating with one or more user equipment devices and/or one or more servers that may at least implement the described providing of personalized audio for different users in a vehicle functionality. The instructions for carrying out the above-mentioned functionality may be stored on one or more user equipment devices and/or one or more servers. Communications circuitry may include a cable modem, an ISDN modem, a DSL modem, a telephone modem, an Ethernet card, a radio (e.g., UWB radio), a wireless modem for communications with other equipment, and/or any other suitable communications circuitry. Such communications may involve the Internet or any other suitable communications networks or paths. In addition, communications circuitry may include circuitry that enables peer-to-peer communication of vehicle entertainment systems, or communication of vehicle entertainment systems in locations remote from each other (described in more detail below). In some embodiments, the communications circuitry uses a radio 720 (e.g., UWB radio) to communication with one or more user equipment devices and/or one or more vehicle entertainment systems. Although only one radio 720 is displayed, the vehicle entertainment system 700 may comprise more than one radio. For example, the vehicle entertainment system 700 may comprise an antenna array.

Memory may be an electronic storage device provided as the storage 708 that is part of the control circuitry 704. As mentioned, "electronic storage device" or "storage device" can be understood to mean any device for storing electronic data, computer software, or firmware, such as random-access memory, read-only memory, hard drives, optical drives, DVD recorders, CD recorders, BD recorders, BLU-RAY 3D disc recorders, DVRs, solid-state devices, quantum storage devices, gaming consoles, gaming media, or any other suitable fixed or removable storage devices, and/or any combination of the same. The storage 708 may also store any number of databases (e.g., media content database, user profile database, registration database, spatial zone database, beamforming parameter database, etc.). The storage 708 may be used to store various types of content described herein. Nonvolatile memory may also be used (e.g., to launch a boot-up routine and other instructions). Cloud-based storage, described in relation to FIG. 5, may be used to supplement the storage 708 or instead of the storage 708.

The control circuitry 704 may include audio generating circuitry and tuning circuitry, such as one or more analog tuners, audio generation circuitry, filters or any other suitable tuning or audio circuits or combinations of such circuits. The control circuitry 704 may also include scaler circuitry for upconverting and down converting content into the preferred output format of the vehicle entertainment system 700. The control circuitry 704 may also include digital-to-analog converter circuitry and analog-to-digital converter circuitry for converting between digital and analog signals. The tuning and encoding circuitry may be used by the vehicle entertainment system 700 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 708 is provided as a separate device from the vehicle entertainment system 700, the tuning and encoding circuitry (including multiple tuners) may be associated with the storage 708.

The user may utter instructions to the control circuitry 704, which are received by the microphone array 716. The microphone array 716 may comprise one or more microphones capable of detecting human speech. The microphone array 716 is connected to the processing circuitry 706 to transmit detected voice commands and other speech thereto for processing.

The vehicle entertainment system 700 may optionally include an interface 710. The interface 710 may be any suitable user interface, such as a remote control, mouse, trackball, keypad, keyboard, touchscreen, touchpad, stylus input, joystick, or other user input interfaces. A display 712 may be provided as a stand-alone device or integrated with other elements of the vehicle entertainment system 700. For example, the display 712 may be a touchscreen or touch-sensitive display. In such circumstances, the interface 710 may be integrated with or combined with the microphone 716. When the interface 710 is configured with a screen, such a screen may be one or more of a monitor, a television, an LCD, active matrix display, cathode ray tube display, light-emitting diode display, organic light-emitting diode display, quantum dot display, or any other suitable equipment for displaying visual images. In some embodiments, the interface 710 may be HDTV-capable. In some embodiments, the display 712 may be a 3D display.

The speaker array 714 may be integrated with other elements of vehicle entertainment system 700 or may be one or more stand-alone units. In some embodiments, the speaker array 714 may be dynamic speakers, planar magnetic speakers, electrostatic speakers, horn speakers, subwoofers, tweeters, and/or similar such speakers. In some embodiments, the control circuitry 704 outputs one or more audio signals to the speaker array 714. In some embodiments, one or more speakers of the speaker array 714 receive and output a unique audio signal. In some embodiments, one or more speakers of the speaker array 714 receive and output the same audio signal. In some embodiments, one or more speakers of the speaker array 714 can change positions and/or orientations.

Figure 8:
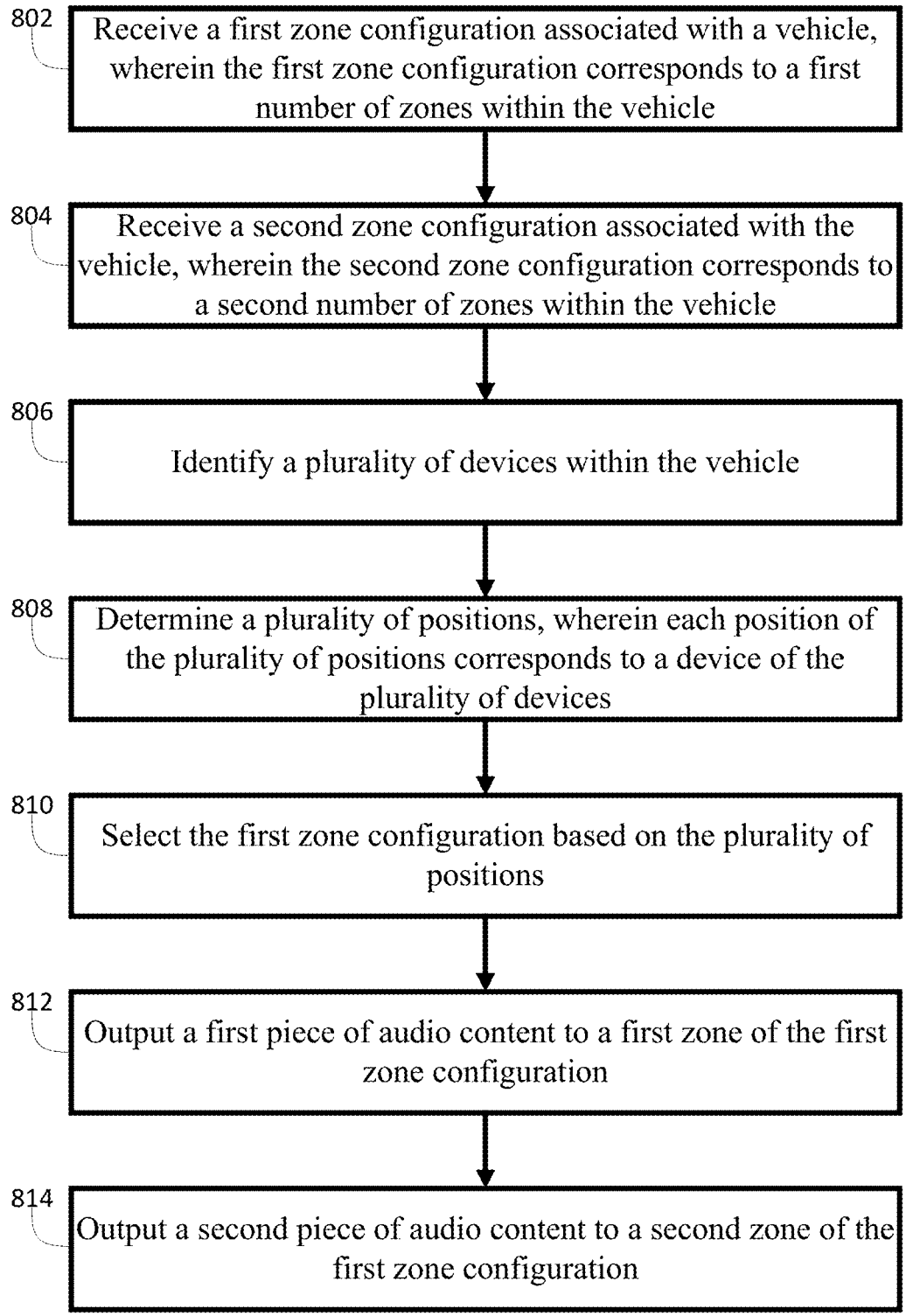
FIG. 8 shows an illustrative flowchart of a process providing personalized audio for different users in a vehicle, in accordance with embodiments of the disclosure.

FIG. 8 is an illustrative flowchart of a process 800 for providing personalized audio settings to one or more users, in accordance with embodiments of the disclosure. Process 800, and any of the following processes, may be executed by control circuitry 604 on a user equipment device 600 and/or by control circuitry 704 of the vehicle entertainment system 700. In some embodiments, control circuitry may be part of a remote server separated from the user equipment device 600 and/or vehicle entertainment system 700 by way of a communications network or distributed over a combination of both. In some embodiments, instructions for executing process 800 may be encoded onto a non-transitory storage medium (e.g., the storage 608, the storage 708) as a set of instructions to be decoded and executed by processing circuitry (e.g., the processing circuitry 606, the processing circuitry 706). Processing circuitry may, in turn, provide instructions to other sub-circuits contained within control circuitry, such as the encoding, decoding, encrypting, decrypting, scaling, analog/digital conversion circuitry, and the like. It should be noted that the process 800, or any step thereof, could be performed on, or provided by, any of the devices shown in FIGS. 1-7. Although the process 800 is illustrated as described as a sequence of steps, it is contemplated that various embodiments of process 800 may be performed in any order or combination and need not include all the illustrated steps.

At 802, control circuitry receives a first zone configuration associated with a vehicle, wherein the first zone configuration corresponds to a first number of zones within the vehicle. At 804, control circuitry receives a second zone configuration associated with the vehicle, wherein the second zone configuration corresponds to a second number of zones within the vehicle. In some embodiments, the control circuitry receives the first zone configuration and the second zone configuration at the same time. In some embodiments, the control circuitry receives the first zone configuration and the second zone configuration at different times. In some embodiments, the control circuitry generates the first zone configuration and/or the second zone configuration when the vehicle is manufactured, when a vehicle entertainment system is installed into the vehicle, at a calibration time, in response to a user input and/or at a similar such time. In some embodiments, the control circuitry receives the first zone configuration and/or the second zone configuration from one or more devices (e.g., first device 123, second device 125, server, etc.). In some embodiments, a user may input one or more preferred zone configuration into a device (e.g., first device 123) and the device may transmit the one or more preferred zone configuration to one or more servers. When a vehicle (e.g., rental car, rideshare vehicle) detects the user in the vehicle, the vehicle may access the one or more preferred zone configurations from the one or more servers. The control circuitry may store the first zone configuration and/or the second zone configuration in one or more databases. For example, the control circuitry may store the first zone configuration and/or the second zone configuration in a spatial zone database. In some embodiments, the zone configurations correspond to any number of zones and the zones may be of any shape or size. In some embodiments, the zones are uniform in size and shape, while in other embodiments, one or more zones are different in size and/or shape compared to one or more other zones.

At 806, control circuitry identifies a plurality of devices within the vehicle. In some embodiments, the control circuitry identifies the plurality of devices using one or more registration processes. For example, whenever a device is within a threshold distance of the control circuitry, the control circuitry and the device may establish a communication session using one or more communication protocols. In another example, the control circuitry and/or the device may initiate the registration process in response to a user input. One or more users may then indicate whether the device should be paired with the control circuitry. For example, a confirmation message may be displayed by the device. In another example, the confirmation message may be displayed by a vehicle display (e.g., display 103). The confirmation message may require a user input to confirm that the device should be paired with the control circuitry. For example, the confirmation message may ask "Do you want to pair this device with the vehicle" and display a first selectable "no" options and a second selectable "yes" option.

In some embodiments, the control circuitry and/or the plurality of devices share device data during the registration process. For example, a first device of the plurality of devices may share a first name (e.g., "Bobby's iPhone 12") associated with the first device. In another example, the first device of the plurality of devices may share a MAC address associated with the first device. In another example, the first device of the plurality of devices may share a network address for UWB, Bluetooth, and/or WiFi associated with the first device. In some embodiments, the control circuitry uses the received network address or network addresses to connect with the first device at a later time. In some embodiments, the control circuitry registers the one or more devices for a single session (e.g., only storing the necessary information for a single session). In some embodiments, the control circuitry registers the one or more devices for more than a single session (e.g., storing information to identify and connect with the one or more devices for future sessions). In some embodiments, the control circuitry stores device data received from the plurality of devices in one or more databases. For example, the control circuitry may store device data received from the first device in a registration database. The registration database may comprise a plurality of entries linking devices to device names, UWB addresses, network connection details, one or more flags, and/or similar such information.

At 808, control circuitry determines a plurality of positions, wherein each position of the plurality of positions corresponds to a device of the plurality of devices. In some embodiments, the control circuitry uses a radio (e.g., UWB radio) to determine the position of each of the identified devices. In some embodiments, each device of the plurality of devices comprises a radio (e.g., UWB radio) capable of communicating with the radio associated with the control circuitry. In some embodiments, the control circuitry uses one or more techniques to determine the positions of each of the identified devices. For example, the control circuitry may use TOF, TDOA, TWR, and/or similar such techniques to determine the positions of the plurality of the devices within the vehicle. In some embodiments, the control circuitry uses Bluetooth, WiFi, and/or similar such communication protocols to determine the positions of each of the identified devices. In some embodiments, the control circuitry uses an antenna array to determine 2D and/or 3D positions of the identified devices.

At 810, control circuitry selects the first zone configuration based on the plurality of positions. The vehicle entertainment system may compare the determined positions to the received zone configurations. In some embodiments, the control circuitry selects the first zone configuration because the first zone configuration has a fewer number of zones than the second zone configuration and at least one device of the plurality of devices is located in each zone of the first zone configuration. For example, a first device may be located on a first seat and a second device may be located on a second seat. The control circuitry may select the first zone configuration comprising a first zone and a second zone, wherein the first zone corresponds to the first seat and the second zone corresponds to the second seat. The vehicle entertainment system may not select the second zone configuration comprising the first zone, the second zone, and a third zone because there are no devices located in the third zone.

At 812, control circuitry outputs a first piece of audio content to a first zone of the first zone configuration. At 814, control circuitry outputs a second piece of audio content to a second zone of the first zone configuration. In some embodiments, the control circuitry uses one or more techniques to provide the different audio content to the different zones. For example, the control circuitry may use beamforming techniques and a speaker array to focus the audio content so that the first piece of audio content is heard primarily in the first zone and the second piece of audio content is heard primarily in the second zone. In another example, one or more zones of the vehicle comprise one or more speakers. The control circuitry may then output the different audio content to the different speakers in the different zones. For example, the control circuitry may use a first speaker embedded in a first seat in a first zone to output the first piece of audio content and may use a second speaker embedded in a second seat in the second zone to output the second piece of audio content.

The control circuitry may determine which audio content to output to the zones based on one or more inputs. For example, the control circuitry may receive a first input from the first user sitting in the first zone. The first input may identify the first piece of audio content. The control circuitry may also receive a second input from the second user sitting in the second zone. The second input may identify the second piece of audio content. In response to receiving the first input and the second input, the control circuitry may output the first piece of audio content to the first zone and may output the second piece of audio content to the second zone. In some embodiments, the control circuitry receives the one or more inputs using one or more methodologies. For example, the control circuitry may receive a first input and/or a second input when a first user selects the first piece of audio content and/or the second piece of audio content using a display (e.g., display 103). In another example, a first user may select the first piece of audio content using a first device associated with the first user and a second user may select the second piece of audio content using a second device associated with the second user. The control circuitry may receive a first input from the first device identifying the first piece of audio content and may receive a second input from the second device identifying the second piece of audio content. In another example, the control circuitry may receive a first input and/or a second input from one or more microphones when a first user utters a request (e.g., "Play Eye of the Tiger"). The control circuitry may identify a first piece of audio content (e.g., "Eye of the Tiger"), based on the received input.

Figure 9:
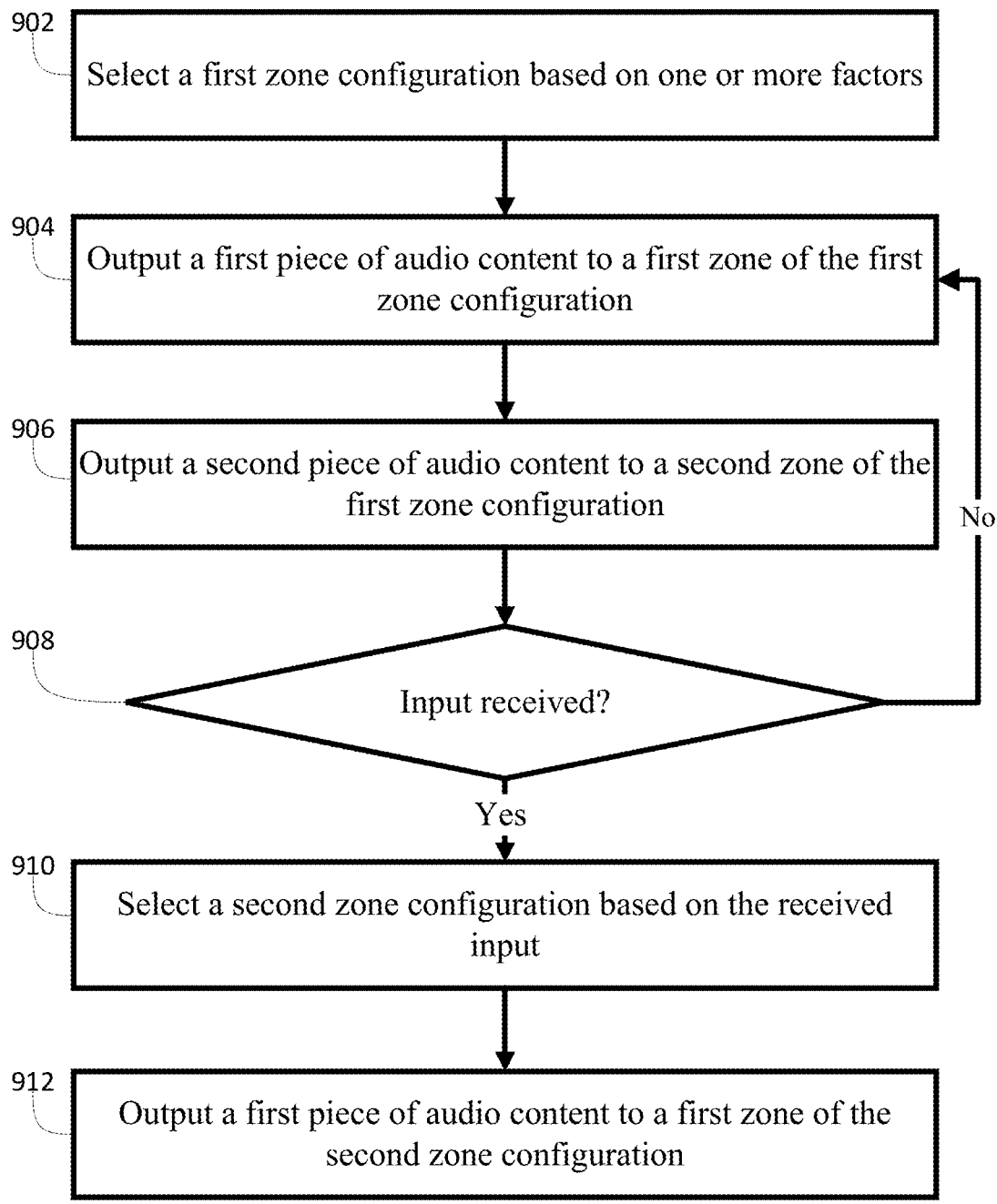
FIG. 9 shows another illustrative flowchart of a process for providing personalized audio for different users in a vehicle, in accordance with embodiments of the disclosure.

FIG. 9 is an illustrative flowchart of a process 900 for providing personalized audio for different users in a vehicle, in accordance with embodiments of the disclosure.

At 902, control circuitry selects a first zone configuration based on one or more factors. In some embodiments, the one or more factors correspond to the positions of one or more user, positions of one or more devices, selections of one or more users, and/or similar such factors. For example, the control circuitry may determine the positions of one or more users based on pressure sensors in seats of a vehicle. The control circuitry may select the first zone configuration because the first zone configuration has the fewest number of zones and at least one user of the plurality of users is located in each zone of the first zone configuration compared to other zone configurations of the plurality of zone configurations. In another example, the control circuitry may determine the positions of devices associated with one or more users. The control circuitry may select the first zone configuration because the first zone configuration has the fewest number of zones and at least one device of the plurality of devices is located in each zone of the first zone configuration compared to other zone configurations of the plurality of zone configurations. In another example, the control circuitry may receive a user selection from a user device and/or from one or microphones within the vehicle. The user selection may identify a zone configuration (e.g., first zone configuration). In response to the user selection, the control circuitry may select the first zone configuration.

At 904, control circuitry outputs a first piece of audio content to a first zone (e.g., front of the vehicle) of the first zone configuration. At 906, control circuitry outputs a second piece of audio content to a second zone (e.g., back of the vehicle) of the first zone configuration. In some embodiments, the control circuitry uses the same or similar methodologies describe at steps 812 and 814 above to output the first piece of audio content to the first zone of the first zone configuration and output the second piece of audio content to a second zone of the first zone configuration.

At 908, control circuitry determines whether an input was received. In some embodiments, the input corresponds to a change in a location of one or more users and/or one or more devices. For example, the control circuitry may determine (e.g., via one or more sensors) that a user has exited the vehicle. In response to determining that the user has exited the vehicle, the control circuitry may determine that an input was received. In another example, the control circuitry may determine that a device is no longer located within the vehicle. In response to determining that the device is no longer located within the vehicle, the control circuitry may determine that an input was received. In another example, the control circuitry may receive a zone configuration request from a user device and/or from one or microphones within the vehicle. The zone configuration request may identify a zone configuration that is different from the first zone configuration. In response to receiving the zone configuration request, the control circuitry may determine that an input was received. If the control circuitry determines that an input was not received, the process 700 returns to step 904 and the audio content is outputted according to the first zone configuration. If the control circuitry determines that an input was received, the process 700 continues to step 910. In some embodiments, the process 900 continues to step 910 if the control circuitry determines that the first zone configuration is no longer the optimal zone configuration. For example, based on a user exiting the vehicle, the control circuitry may determine that the first zone configuration comprises a zone without a user. Accordingly, the control circuitry may determine that the first zone configuration is no longer the optimal zone configuration.

At 910, control circuitry selects a second zone configuration based on the received input. For example, the received input may correspond to a user exiting the vehicle. The control circuitry may select the second zone configuration because the second zone configuration now has the fewest number of zones and at least one user of the plurality of users is located in each zone of the second zone configuration compared to other zone configurations of the plurality of zone configurations. In another example, the received input may correspond to a device not being located within the vehicle. The control circuitry may select the second zone configuration because the second zone configuration now has the fewest number of zones and at least one device of the plurality of devices is located in each zone of the second zone configuration compared to other zone configurations of the plurality of zone configurations.

At 912, control circuitry outputs the first piece of audio content to a first zone of the second zone configuration. In some embodiments, the first zone of the second zone configuration corresponds to a different section of the vehicle compared to the first zone of the first zone configuration. For example, the first zone of the first zone configuration may be the front of the vehicle while the first zone of the second zone configuration may be the entire vehicle. In another example, the first zone of the first zone configuration may correspond to a first seat in the back of the vehicle while the first zone of the second zone configuration may be the entire back of the vehicle. In some embodiments, the control circuitry uses one or more techniques (e.g., beamforming) to provide the different audio content to the different zones of the second zone configuration.

Figure 10:
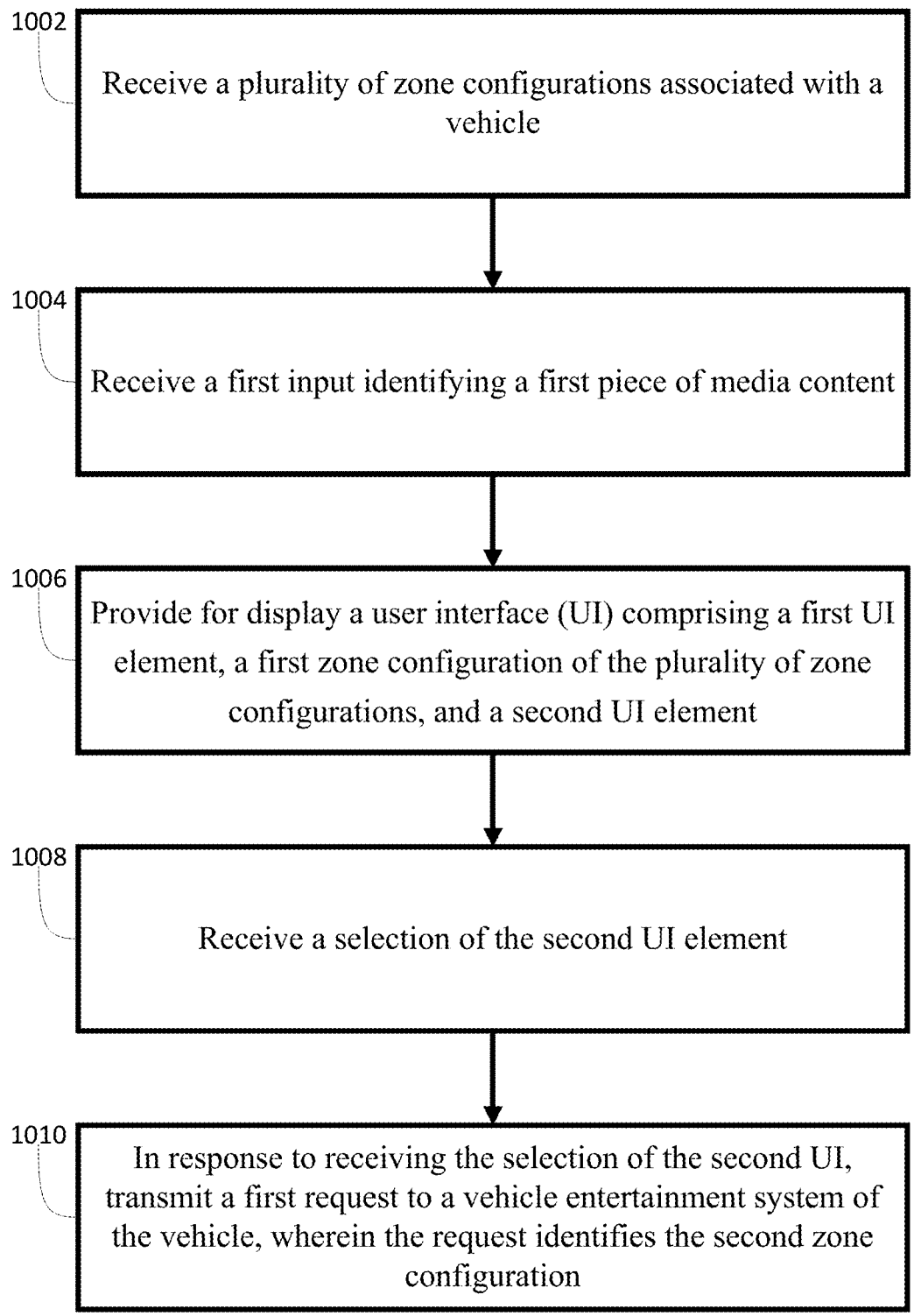
FIG. 10 shows another illustrative flowchart of a process for providing personalized audio for different users in a vehicle, in accordance with embodiments of the disclosure.

FIG. 10 is another illustrative flowchart of a process 1000 for providing personalized audio for different users in a vehicle, in accordance with embodiments of the disclosure.

At 1002, control circuitry receives a plurality of zone configurations associated with a vehicle. In some embodiments, the control circuitry receives the plurality of zone configuration from one or more devices (e.g., first device 123, second device 125, vehicle entertainment system, server, etc.). In some embodiments, the control circuitry receives the plurality of zone configurations based on a request. For example, the control circuitry may transmit a request to a server, wherein the request identifies a vehicle (e.g., vehicle 102) and/or a vehicle type (e.g., make, model, size, seat numbers, etc.). The control circuitry may receive the plurality of zone configuration, wherein each zone configuration of the plurality of zone configurations is associated with the identified vehicle and/or vehicle type. The control circuitry may store the plurality of zone configurations in one or more databases. For example, the control circuitry may store the plurality of zone configurations in a spatial zone database. In some embodiments, the plurality of zone configurations correspond to any number of zones and the zones may be of any shape or size. In some embodiments, the zones are uniform in size and shape, while in other embodiments, one or more zones are different in size and/or shape compared to one or more other zones. In some embodiments, the control circuitry generates one or more zone configurations when a vehicle is manufactured, when a vehicle entertainment system is installed into the vehicle, at a calibration time, and/or at a similar such time.

At 1004, control circuitry receives a first input identifying a first piece of media content. For example, the control circuitry may receive the first input when a first user selects the first piece of media content using a display (e.g., display 103). In another example, a first user may select the first piece of media content using a first device (e.g., first device 123) associated with the first user. The control circuitry may then receive the first input when the first device transmits the selection of the first piece of media content to the control circuitry. In another example, the control circuitry may receive a first input from one or more microphones when a first user utters a request (e.g., "Play Eye of the Tiger"). The control circuitry may identify a first piece of media content (e.g., "Eye of the Tiger"), based on the received input. In some embodiments, the control circuitry outputs the first piece of media content to one or more zones within the vehicle based on the received first input.

At 1006, control circuitry provides for display a UI comprising a first UI element, a first zone configuration of the plurality of zone configurations, and a second UI element. In some embodiments, the UI reflects media content being output in one or more zones of the vehicle (e.g., vehicle 102). The UI may comprise any number of UI elements but only some of the elements are described herein. The first UI element may be a media content identifier (e.g., thumbnail image, title, artist information, etc.) corresponding to the first piece of media content (e.g., "Eye of the Tiger"). In some embodiments, the first UI element also comprises a progress bar corresponding to the first piece of media content. In some embodiments, the progress bar is a separate UI element. In some embodiments, the first UI element also comprises playback command options. In some embodiments, one or more playback command options are separate UI elements. One or more users may use the playback command options to input one or more playback commands. For example, one or more users may pause, rewind, replay, fast forward, and/or skip the first piece of media by interacting with the first UI element. In some embodiments, the control circuitry adjusts the playback of the first piece of media content in the one or more zones where the first piece of media content is being outputted according to the playback command. For example, if the first piece of media content is being outputted to a first zone and a user issues a pause command, the control circuitry may pause playback of the first piece of media content in the first zone.

In some embodiments, the UI may also comprise a zone configuration comprising one or more zones, along with a depiction of the inside of the vehicle. For example, the UI may display a depiction of the zone configuration comprising a depiction of a first zone, a depiction of a second zone, a depiction of a third zone, and a depiction of a fourth zone. In some embodiments, the zone configuration is overlayed over the depiction of the inside of the vehicle. In some embodiments, the zone configuration and/or the depiction of the inside of the vehicle are UI elements. In some embodiments, the UI also comprises a second UI element. In some embodiments, the second UI element corresponds to a second zone configurations.

At 1008, control circuitry receives a selection of the second UI element. For example, a first user may tap the second UI element on a touchscreen to select the second UI element. In another example, the first user may utter "switch to the second zone configuration" to select the second UI element.

At 1010, control circuitry transmits a first request to a vehicle entertainment system of the vehicle, wherein the request identifies the second zone configuration in response to receiving the selection of the second UI. In response to receiving the request, the vehicle entertainment system may switch from outputting media content according to the first zone configuration to outputting media content according to the selected zone configuration (e.g., second zone configuration). For example, the vehicle entertainment system may be outputting the first piece of media content to a first zone and may be outputting a different piece of media content to a second zone. In response to the first request, the vehicle entertainment system may output the first piece of media content to the first zone and the second zone.

It is contemplated that some suitable steps or suitable descriptions of FIGS. 8-10 may be used with other suitable embodiments of this disclosure. In addition, some suitable steps and descriptions described in relation to FIGS. 8-10 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-7 could be used to perform one or more of the steps in FIGS. 8-10.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, by a device, a plurality of zone configurations associated with a vehicle;
   receiving, by the device, a first input identifying a first piece of media content;
   providing for display a user interface (UI) comprising:
      a first UI element corresponding to the first piece of media content;
      a first zone configuration of the plurality of zone configurations overlayed over a depiction of the inside of the vehicle; and
      a second UI element corresponding to a second zone configuration of the plurality of zone configurations;
   receiving, by the device, a selection of the second UI element;
   in response to receiving the selection of the second UI, transmitting a first request to a vehicle entertainment system of the vehicle, wherein the request identifies the second zone configuration; and
   providing for display an updated UI comprising:
      the second zone configuration overlayed over the depiction of the inside of the vehicle; and
      a third UI element corresponding to the first zone configuration of the plurality of zone configurations.

2. The method of claim 1, further comprising transmitting a second request to the vehicle entertainment system in response to receiving the first input identifying the first piece of media content, wherein the second request identifies the first piece of media content.

3. The method of claim 2, further comprising:
   receiving, by the device, a second input identifying a second piece of media content; and
   transmitting a third request to the vehicle entertainment system in response to receiving the second input identifying the second piece of media content, wherein the third request identifies the second piece of media content.

4. The method of claim 2, further comprising:
   receiving, by the device, a second input identifying a command; and
   transmitting a third request to the vehicle entertainment system in response to receiving the second input identifying the command, wherein the third request indicates the command.

5. The method of claim 4, wherein the command is one of a: a pause command, a replay command, or a skip command.

6. The method of claim 1, wherein the first UI element is a title associated with the first piece of media content.

7. The method of claim 1, wherein receiving, by the device, the plurality of zone configurations associated with the vehicle comprises:
   receiving a first configuration input, wherein the first configuration input corresponds to a first number of zones;
   receiving a second configuration input, wherein:
      the second configuration input corresponds to a second number of zones; and
      the first number of zones is different than the first number of zones.

8. The method of claim 7, further comprising:
storing the first zone configuration according to the received first configuration input, wherein the first zone configuration overlayed over the depiction of the inside of the vehicle comprises the first number of zones; and
storing the second zone configuration according to the received second configuration input, wherein the second zone configuration overlayed over the depiction of the inside of the vehicle comprises the second number of zones.

9. The method of claim 8, wherein the updated UI further comprises a fourth UI element corresponding to the stored first zone configuration.

10. The method of claim 1, wherein the UI further comprises a fourth UI element corresponding to a third zone configuration of the plurality of zone configurations, wherein the second UI element and the fourth UI element are displayed at the same time.

11. The method of claim 1, wherein the UI further comprises a fourth UI element corresponding to the first zone configuration of the plurality of zone configurations, wherein:
the second UI element and the fourth UI element are displayed at the same time;
the fourth UI element is displayed in a first format that is different than the second UI element.

12. The method of claim 11, wherein the first format indicates that the first zone configuration is used by vehicle entertainment system of the vehicle to output the first piece of media content.

13. The method of claim 12, wherein the first format corresponds to at least one of a color, shape, size, texture, or animation.

14. The method of claim 1, further comprising:
accessing, by the device, a first user profile, wherein the first user profile comprises user information; and
determining authorization information for the first user profile based on the user information, wherein the second UI element corresponding to the second zone configuration is displayed based, at least in part, on determining that the authorization information for the first user profile authorizes the first user profile to update a vehicle entertainment system's zone configuration.

15. An apparatus, comprising:
control circuitry; and
at least one memory including computer program code for one or more programs, the at least one memory and the computer program code configured to, with the control circuitry, cause the apparatus to perform at least the following:
receive a plurality of zone configurations associated with a vehicle;
receive a first input identifying a first piece of media content;
provide for display a user interface (UI) comprising:
a first UI element corresponding to the first piece of media content;
a first zone configuration of the plurality of zone configurations overlayed over a depiction of the inside of the vehicle; and
a second UI element corresponding to a second zone configuration of the plurality of zone configurations;
receive a selection of the second UI element;
in response to receiving the selection of the second UI, transmit a first request to a vehicle entertainment system of the vehicle, wherein the request identifies the second zone configuration; and
provide for display an updated UI comprising:
the second zone configuration overlayed over the depiction of the inside of the vehicle; and
a third UI element corresponding to the first zone configuration of the plurality of zone configurations.

16. The apparatus of claim 15, wherein the apparatus is further caused to transmit a second request to the vehicle entertainment system in response to receiving the first input identifying the first piece of media content, wherein the second request identifies the first piece of media content.

17. The apparatus of claim 16, wherein the apparatus is further caused to:
receive a second input identifying a second piece of media content; and
transmit a third request to the vehicle entertainment system in response to receiving the second input identifying the second piece of media content, wherein the third request identifies the second piece of media content.

18. The apparatus of claim 16, wherein the apparatus is further caused to:
receive a second input identifying a command; and
transmit a third request to the vehicle entertainment system in response to receiving the second input identifying the command, wherein the third request indicates the command.

19. The apparatus of claim 18, wherein the command is one of a: a pause command, a replay command, or a skip command.

20. A non-transitory computer-readable medium having instructions encoded thereon that, when executed by control circuitry, cause the control circuitry to:
receive a plurality of zone configurations associated with a vehicle;
receive a first input identifying a first piece of media content;
provide for display a user interface (UI) comprising:
a first UI element corresponding to the first piece of media content;
a first zone configuration of the plurality of zone configurations overlayed over a depiction of the inside of the vehicle; and
a second UI element corresponding to a second zone configuration of the plurality of zone configurations;
receive a selection of the second UI element;
in response to receiving the selection of the second UI, transmit a first request to a vehicle entertainment system of the vehicle, wherein the request identifies the second zone configuration; and
provide for display an updated UI comprising:
the second zone configuration overlayed over the depiction of the inside of the vehicle; and
a third UI element corresponding to the first zone configuration of the plurality of zone configurations.

* * * * *